(12) United States Patent
Farrugia et al.

(10) Patent No.: US 11,932,735 B2
(45) Date of Patent: Mar. 19, 2024

(54) GRAPHENE OXIDE-DOPED POLYVINYLIDENE FLUORIDE PARTICLES WITH ENHANCED BETA-PHASE CRYSTALLINITY

(71) Applicant: Xerox Corporation, Norwalk, CT (US)

(72) Inventors: Valerie M. Farrugia, Oakville (CA); Robert Claridge, Kitchener (CA); Hojjat Seyed Jamali, Mississauga (CA)

(73) Assignee: Xerox Corporation, Norwalk, CT (US)

(*) Notice: Subject to any disclaimer, the term of this patent is extended or adjusted under 35 U.S.C. 154(b) by 228 days.

(21) Appl. No.: 17/346,737

(22) Filed: Jun. 14, 2021

(65) Prior Publication Data

US 2022/0396674 A1    Dec. 15, 2022

(51) Int. Cl.
| | | |
|---|---|---|
| *C08J 3/20* | (2006.01) | |
| *C08F 14/22* | (2006.01) | |
| *C08J 3/205* | (2006.01) | |
| *C08K 3/04* | (2006.01) | |
| *C09D 11/037* | (2014.01) | |
| *C09D 11/101* | (2014.01) | |
| *C09D 11/106* | (2014.01) | |

(52) U.S. Cl.
CPC ............. *C08J 3/2056* (2013.01); *C08F 14/22* (2013.01); *C08K 3/042* (2017.05); *C09D 11/037* (2013.01); *C09D 11/101* (2013.01); *C09D 11/106* (2013.01); *C08K 2201/005* (2013.01); *C08K 2201/011* (2013.01)

(58) Field of Classification Search
CPC ...... C08J 3/2056; C08J 3/205; C08J 2327/17; C08J 3/20; C08J 2327/18; C08F 14/22; C09D 11/037; C09D 11/101; C09D 11/106; B33Y 70/10; C08L 2205/242; C08L 27/18
USPC ....................................................... 524/496
See application file for complete search history.

(56) References Cited

U.S. PATENT DOCUMENTS

2019/0054659 A1* 2/2019 Tseng ..................... B33Y 70/10

FOREIGN PATENT DOCUMENTS

| CN | 108359197 A | 8/2018 |
| CN | 110070990 A | 7/2019 |
| WO | 2018/085936 A1 | 5/2018 |
| WO | 2020/041435 A1 | 2/2020 |

OTHER PUBLICATIONS

EP Search Report dated Oct. 26, 2022 for related matter EP22176757.7.
El Achaby M et al; "Piezoelectric-polymorph formation and properties enhancement in graphene oxide PVDF nanocomposite films;" Applied Surface Science, vol. 258, No. 19; Apr. 18, 2012.
Shuai Cijun et al; "Graphene oxide assists polyvinylidene flouride scaffold to reconstruct electrical microenvironment of bone tissue;" Materials & Design, vol. 190; Feb. 11, 2020.

* cited by examiner

*Primary Examiner* — Hannah J Pak
(74) *Attorney, Agent, or Firm* — Vorys, Sater, Seymour and Pease, LLP

(57) ABSTRACT

High spherical particles for use in piezoelectric applications may be produced mixing a mixture comprising a graphene oxide-polyvinylidene fluoride (GO-PVDF) composite, a carrier fluid that is immiscible with the PVDF, and optionally an emulsion stabilizer at a temperature equal to or greater than a melting point or softening temperature of the PVDF to disperse the GO-PVDF composite in the carrier fluid, wherein the GO-PVDF composite has a transmission FTIR minimum transmittance ratio of β-phase PVDF to α-phase PVDF of about 1 or less; cooling the mixture to below the melting point or softening temperature of the PVDF to form GO-PVDF particles; and separating the GO-PVDF particles from the carrier fluid, wherein the GO-PVDF particles comprise the graphene oxide dispersed in the PVDF, and wherein the GO-PVDF particles have a transmission FTIR minimum transmittance ratio of β-phase PVDF to α-phase PVDF of about 1 or less.

15 Claims, 17 Drawing Sheets

GRAPHENE OXIDE-DOPED POLYVINYLIDENE FLUORIDE PARTICLES WITH ENHANCED BETA-PHASE CRYSTALLINITY

TECHNICAL FIELD

The present disclosure relates to particles that comprise graphene oxide and polyvinylidene fluoride (PVDF) where the PVDF advantageously has β-phase crystallinity. Said particles are referred to as graphene oxide-doped polyvinylidene fluoride particles or GO-PVDF particles. The present disclosure further relates to the methods of making and using such GO-PVDF particles.

BACKGROUND

Three-dimensional (3-D) printing, also known as additive manufacturing, is a rapidly growing technology area. Although additive manufacturing has traditionally been used for rapid prototyping activities, additive manufacturing is being increasingly employed for producing commercial and industrial objects, which may have entirely different structural and mechanical tolerances than do rapid prototypes. In order to exploit the full advantages of additive manufacturing, besides improvement in the hardware, software, and the like, the development of new materials with wider range of physicochemical properties is necessary. The development of new materials may assist in advancing the functionality and print quality of additive manufacturing feedstock.

Additive manufacturing techniques are mainly based on solidification of melted materials or selective fusion of powder-bed material using an energy source. By using powder-bed fusion methods such as selective laser sintering (SLS), it is possible to produce complex parts with extremely fine microstructures when the correct feedstock powder is used. As an example, SLS technology has been used to produce implants and artificial scaffolds with graded porosity to match human bone structure. The transition from temporary replacement bone filling to permanent replacement has been achieved but some issues still exist such as the poor integration of tissue-scaffold interface, long repair cycles and lack of control over repair capabilities.

Another area in which additive manufacturing is expanding is the concept of four-dimensional printing where the 3-D printed object can respond to stimuli (e.g., heat, light, chemicals, electricity, and magnetic field or any other type of energy sources). For example, the response to stimuli may change and/or transform into the object into another shape or structure. This advanced technology may be useful in high-tech fields such as soft robots, biomedical engineering, electronics, and functional modern textiles.

To address the defects mentioned previously in the 3D printing of artificial bone, 4D printing technology has been suggested as a possible solution. The extra-dimension to the printed bone scaffolds is the introduction of an electroactive material, such as a piezoelectric biomaterial, that has the ability to reconstruct the electrical microenvironment of cell or tissue growth. Piezoelectric materials may have the ability to generate electrical stimulation during body movement without any influence of external power sources. This electrical stimulation can enable the regulation of various cellular functions related to intracellular pathway activation and cytoskeleton reorganization.

Traditionally, piezoelectric materials are lead-based ceramics or the other inorganic materials. In spite of the low cost and good piezoelectric efficiency of lead-based materials, such materials suffer several serious drawbacks including high toxicity, poor mechanical flexibility, chemical stability issues, processing difficulty, and biological incompatibility. Research related to lead-free and/or polymer-based piezoelectric materials (e.g., PVDF) is attracting great deal of attention for a lightweight, inexpensive, and flexible biocompatible piezoelectric material that is easily processed into dispersed solutions, thin films, fibers, membranes, and molded parts. Incorporation of such materials into additive manufacturing methods like SLS techniques would require highly spherical polymer particles with piezoelectric properties.

PVDF has at least five crystalline forms (identified as α, β, γ, δ and ε) where gamma (γ) phase crystallinity and beta (β) phase crystallinity show piezoelectric properties. Out of the two forms, the β-phase crystalline structure is the stronger at driving piezo properties. That said, any improvement in the ratio of β-phase crystallinity may translate to greater piezoelectric response and higher efficiency of final part for any given application. The β-phase crystalline structure of PVDF, as a piezoelectric material, may react to changes in its environment where electrical energy is converted to mechanical energy and vice versa. For instance, if mechanical stimuli is applied to a surface, a charge at a surface of a PVDF having high β-phase crystallinity may vary without the need for an additional energy source or electrodes. Much effort has been devoted to increasing the percentage of the β-phase crystallinity in PVDF over the other non-piezoelectric crystalline phases. One additive that has shown some promise is graphene oxide nanosheets (also referred to herein as graphene oxide) because of the hydrogen-bonding interaction between β-phase crystalline structure of PVDF and the graphene oxide.

Early research related to PVDF and graphene oxide composites have generally be related to dry blending of powders or wet blending of powders. Without being limited by theory, it is believed that this does not provide a suitable dispersion of graphene oxide in the PVDF. Rather, the composite structure includes graphene oxide nanosheets covering PVDF particles and agglomerations of graphene oxide nanosheets.

Improved dispersion of the graphene oxide in the PVDF is needed. Further, to incorporate PVDF and graphene oxide composites into additive manufacturing methods like SLS techniques, highly spherical polymer particles of the well dispersed graphene oxide in PVDF would be needed.

SUMMARY OF THE INVENTION

The present disclosure relates to particles that comprise graphene oxide and PVDF where the PVDF advantageously has β-phase crystallinity. Said particles are referred to as graphene oxide-doped polyvinylidene fluoride particles or GO-PVDF particles. The present disclosure further relates to the methods of making and using such GO-PVDF particles.

Disclosed herein are methods that comprise: providing a graphene oxide-polyvinylidene fluoride (GO-PVDF) composite comprising graphene oxide dispersed in polyvinylidene fluoride (PVDF), wherein the GO-PVDF composite has a transmission FTIR minimum transmittance ratio of β-phase PVDF to α-phase PVDF of about 1 or less; mixing a mixture comprising a GO-PVDF composite, a carrier fluid that is immiscible with the PVDF, and optionally an emulsion stabilizer at a temperature equal to or greater than a melting point or softening temperature of the PVDF to disperse the GO-PVDF composite in the carrier fluid; cooling the mixture to below the melting point or softening temperature of the PVDF to form GO-PVDF particles; and separating the GO-PVDF particles from the carrier fluid, wherein the GO-PVDF particles comprise the graphene oxide dispersed in the PVDF, and wherein the GO-PVDF particles have a transmission FTIR minimum transmittance ratio of β-phase PVDF to α-phase PVDF of about 1 or less.

Disclosed herein are methods that comprise: producing a mixture comprising graphene oxide, PVDF, and a solvent; and evaporating the solvent from the mixture to yield a GO-PVDF composite that comprises about 1 wt % or less of the solvent, wherein evaporating is a temperature less than a boiling point+10° C. of the solvent ($T_{BP+10C}$ of the solvent), and wherein the GO-PVDF composite has a transmission FTIR minimum transmittance ratio of β-phase PVDF to α-phase PVDF of about 1 or less.

Disclosed herein are compositions that comprise: graphene oxide-polyvinylidene fluoride (GO-PVDF) particles comprising graphene oxide dispersed in polyvinylidene fluoride (PVDF), wherein the GO-PVDF particles have a transmission FTIR minimum transmittance ratio of β-phase PVDF to α-phase PVDF of about 1 or less.

Disclosed herein are methods that comprise: depositing, upon a surface, the foregoing GO-PVDF particles optionally in combination with thermoplastic polymer particles; and once deposited, heating at least a portion of the particles to promote consolidation thereof and form a consolidated body, wherein the consolidated body has a β-phase retention from the GO-PVDF particles of about 0.1 to about 1.5.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
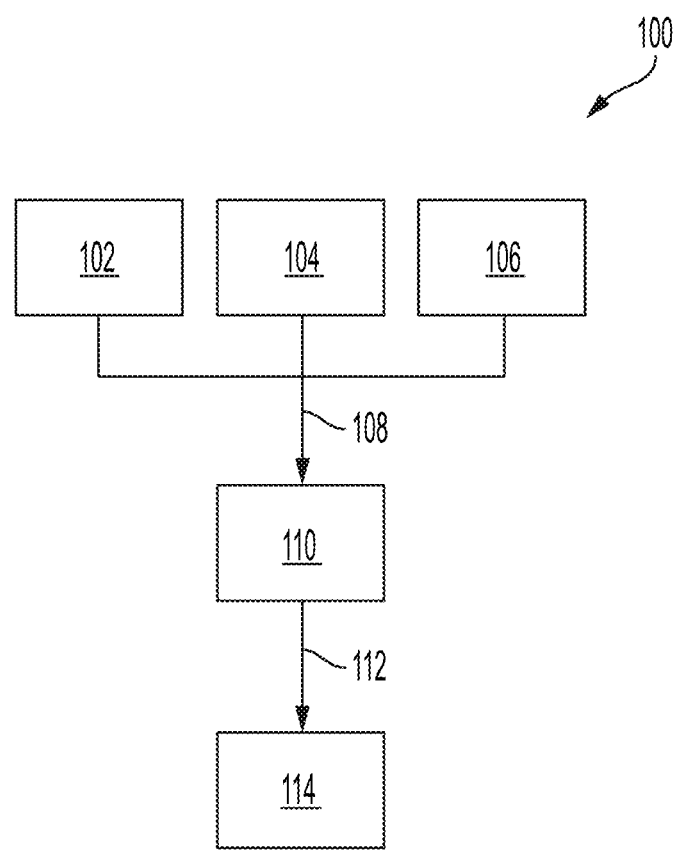
FIG. 1 is a flow chart of a nonlimiting example method of the present disclosure.

The present disclosure relates to particles that comprise graphene oxide dispersed in polyvinylidene fluoride where the polyvinylidene fluoride advantageously has β-phase crystallinity. Said particles are referred to as graphene oxide-doped polyvinylidene fluoride particles or GO-PVDF particles. The present disclosure further relates to the methods of making and using such GO-PVDF particles.

Methods described herein may include making a GO-PVDF composite where the graphene oxide is dispersed in the PVDF and agglomeration of the graphene oxide is mitigated. Without being limited by theory, it is believed that by improving the dispersion of the graphene oxide in the PVDF may increase the amount of β-phase crystallinity because more surface area of the graphene oxide is exposed to the PVDF and the graphene oxide preferentially orients the PVDF in the β-phase crystalline structure.

Additional methods describe herein include making highly spherical GO-PVDF particles by melt emulsification methods using the foregoing GO-PVDF composite having a high β-phase crystallinity. Advantageously, a significant amount of the β-phase crystallinity is maintained during the melt emulsification method. Further, SLS techniques using the highly spherical GO-PVDF particles with a high β-phase crystallinity do not appear to significantly, if at all, reduce the amount of β-phase crystallinity. Therefore, the highly spherical GO-PVDF particles with a high β-phase crystallinity described herein may be useful for producing objects with good piezoelectric properties by SLS techniques.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the terms "graphene oxide" and "graphene oxide nanosheets" refer structures of one to about thirty layers of oxidized graphene. Generally, graphene oxide is produced by treating graphite to a strong oxidizer and/or acids. However, the terms "graphene oxide" and "graphene oxide nanosheets" are not limited by the method of production.

As used herein, the "degree of oxidation" for graphene oxide is determined by relative percentage of oxygen-containing functional groups ($RP_{OCFG}$) with respect to the presence of all functional groups observe in an FTIR spectrum in the wavenumber range of 900 cm' to 1850 cm' as described in *Mater. Chem. Phys.* 2015, 153, 209-220, DOI: 10.1016.

As used herein, the "polymer" has two or more of the same or different mer units. A "homopolymer" is a polymer having mer units that are the same. The term "polymer" as used herein includes, but is not limited to, homopolymers, copolymers, terpolymers, etc. The term "polymer" as used herein also includes impact, block, graft, random, and alternating copolymers.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit."

As used herein, when a polymer is referred to as "comprising," "consisting of," or "consisting essentially of" a monomer (or a comonomer) or monomer-derived units (or comonomer-derived units), the monomer (or a comonomer) is present in the polymer in the polymerized/derivative form of the monomer (or a comonomer). For example, when a copolymer is said to have a polyvinylidene fluoride content of 35 wt % to 55 wt %, it is understood that the mer unit in the copolymer is derived from polyvinylidene fluoride in the polymerization reaction and said derived units are present at 35 wt % to 55 wt %, based upon the weight of the copolymer.

As used herein, the terms "polyvinylidene fluoride" and "PVDF" encompass polyvinylidene fluoride homopolymers, copolymers comprising vinylidene fluoride-derived units, and mixtures thereof.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the term "embed" relative to particles (e.g., nanoparticles and/or graphene oxide) and a surface of a polymer particle refers to the particle being at least partially extending into the surface of the polymer particle such that polymer is in contact with the particle (e.g., nanoparticles and/or graphene oxide) to a greater degree than would be if the particle (e.g., nanoparticles and/or graphene oxide) were simply laid on the surface of the polymer particle.

As used herein, the term "encapsulated" relative to particles (e.g., nanoparticles and/or graphene oxide) and polymer particles refers to the particle being enclosed by the polymer particle. That is, portions of said particles (e.g., nanoparticles and/or graphene oxide) do not extend beyond the surface of the polymer particle. The term "encapsulate" does not imply a degree to which the surface of the particle (e.g., nanoparticles and/or graphene oxide) surface is contact with polymer. For example, the particle (e.g., nanoparticles and/or graphene oxide) may be at least partially in a void within the polymer particle and only a portion of the surface of the particle be in contact with the polymer.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90−D10)/D50.

Particle diameters and particle size distributions are determined by light scattering techniques using a Malvern MASTERSIZER™ 3000. For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Aerated density ($\rho_{aer}$) is measured per ASTM D6393-14.
Bulk density ($\rho_{bulk}$) is measured per ASTM D6393-14.
Tapped density ($\rho_{tap}$) is measured per ASTM D6393-14.
Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil), the kinematic viscosity data cited herein was provided by the manufacturer, whether measured according to the foregoing ASTM or another standard measurement technique.

The PVDF copolymers may have a weight-average molecular weight ($M_w$) of about 75 kDa to about 600 kDa (or about 75 kDa to about 250 kDa, or about 200 kDa to about 400 kDa, or about 300 kDa to about 600 kDa).

The PVDF copolymers may have a number-average molecular weight ($M_n$) of about 30 kDa to about 300 kDa (or about 300 kDa to about 150 kDa, or about 100 kDa to about 200 kDa, or about 150 kDa to about 300 kDa).

The PVDF copolymers may have a polydispersity index ($M_w/M_n$) of about 1.5 to about 2.5 (about 1.5 to about 2.0, or about 2.0 to about 2.5).

Mw is the weight-average molecular weight, and Mn is the number average molecular weight. Unless otherwise noted, Mw and Mn has units of g/mol or kDa (1,000 g/mol=1 kDa) and is measured by gel permeation chromatography. Polydispersity index or PDI is Mw/Mn.

Transmission Fourier-transform infrared (FTIR) of samples is performed using was the Bruker Alpha II FTIR spectrometer with a Diamond Crystal ATR (Attenuated Total internal Reflectance) accessory. Measurement of liquid and solid samples can be made directly without the need for salt plate or specialized sample handling.

Samples were placed directly on the diamond crystal plate. For a solid, enough powder was applied to coat the crystal with approximately 1 mm thickness of material. The pressure arm was positioned over the sample, and pressure was applied to the sample.

As used herein, the transmission FTIR minimum transmittance for β-phase PVDF (t-FTIR-β) is the minimum transmittance (%) between 840 cm$^{-1}$ and 820 cm$^{-1}$.

As used herein, the transmission FTIR minimum transmittance for α-phase PVDF (t-FTIR-α) is the minimum transmittance (%) between 775 cm$^{-1}$ and 750 cm$^{-1}$.

As used herein, a transmission FTIR minimum transmittance ratio of β-phase PVDF to α-phase PVDF is t-FTIR-β divided by t-FTIR-α.

As used herein, a β-phase retention from a first material to as second material is defined as the transmission FTIR minimum transmittance ratio of β-phase PVDF for the first material divided by transmission FTIR minimum transmittance ratio of β-phase PVDF of the second material. For example, a GO-PVDF composite having a transmission FTIR minimum transmittance ratio of β-phase PVDF of 0.3% used to produce GO-PVDF particles having a transmission FTIR minimum transmittance ratio of β-phase PVDF of 0.5% has a β-phase retention of 0.3%/0.5%=0.6.

GO-PVDF Composite and Methods of Making

The present disclosure includes methods for producing a GO-PVDF composite comprising graphene oxide dispersed in a PVDF that has a transmission FTIR minimum transmittance ratio of β-phase PVDF to α-phase PVDF of about 1 or less (or about 0.9 or less, or about 0.8 or less, or about 0.7 or less, or about 0.6 or less, or about 0.5 or less, or 0 to about 1, or 0 to about 0.9, or 0 to about 0.8, or 0 to about 0.7, or 0 to about 0.6, or 0 to about 0.5). If the transmission FTIR minimum transmittance for α-phase PVDF The graphene oxide may have an average thickness of about 0.3 nm to about 5 nm (or about 0.3 nm to about 1 nm, or about 0.5 nm to about 3 nm, or about 1 nm to about 5 nm).

The graphene oxide may have a degree of oxidation of about 30% to about 80% (or about 30% to about 50%, or about 40% to about 65%, or about 50% to about 80%.

The graphene oxide may have a nitrogen BET surface area of about 300 m$^2$/g to about 1000 m$^2$/g (or about 300 m$^2$/g to about 600 m$^2$/g, or about 450 m$^2$/g to about 750 m$^2$/g, or about 600 m$^2$/g to about 1000 m$^2$/g).

The graphene oxide may be a powder of agglomerate graphene oxide where said powder has an average diameter (D50) of about 0.1 microns to about 10 microns (or about 0.1 microns to about 5 microns, or about 0.5 microns to about 3 microns, or about 2 microns to about 10 microns).

Examples of commercially available graphene oxide include, but are not limited to, single layer graphene oxide flake (H method) available from ACS Material, single layer graphene oxide powder (H method) available from ACS Material, graphene oxide (S method) available from ACS Material, high surface area graphene oxide available from ACS Material, graphene oxide powder (15-20 sheets) available from SigmaAldrich, graphene oxide sheets available from SigmaAldrich, and the like, and any combination thereof.

The PVDF may be polyvinylidene fluoride homopolymers, copolymers comprising vinylidene fluoride-derived units and comonomer-derived units, or a mixture thereof. Examples of comonomers may include, but are not limited to, trifluoroethylene, trifluoroethylene, hexafluoropropylene, tetrafluoroethylene, perfluoro(methyl vinyl ether), and the like, and any combination thereof. The PVDF copolymers may comprises about 50 mol % to about 95 mol % (or about 50 mol % to about 75 mol %, or about 65 mol % to about 85 mol %, or about 75 mol % to about 95 mol %) vinylidene fluoride-derived units and about 5 mol % to about 50 mol % (or about 5 mol % to about 25 mol %, or about 15 mol % to about 35 mol %, or about 25 mol % to about 50 mol %) of one or more comonomers (cumulatively).

The PVDF copolymers may have a melting point of about 150° C. to about 200° C. (or about 150° C. to about 180° C., or about 175° C. to about 200° C.).

The PVDF copolymers may have a weight-average molecular weight (Mw) of about 75 kDa to about 600 kDa (or about 75 kDa to about 250 kDa, or about 200 kDa to about 400 kDa, or about 300 kDa to about 600 kDa).

The PVDF copolymers may have a number-average molecular weight (Mn) of about 30 kDa to about 300 kDa (or about 300 kDa to about 150 kDa, or about 100 kDa to about 200 kDa, or about 150 kDa to about 300 kDa).

The PVDF copolymers may have a polydispersity index (Mw/Mn) of about 1.5 to about 2.5 (about 1.5 to about 2.0, or about 2.0 to about 2.5).

The weight ratio of graphene oxide to PVDF in the GO-PVDF composite may be about 0.01:99.99 to about 10:90 (or about 0.01:99.99 to about 1:99, or about 1:99 to about 5:95, or about 5:95 to about 10:90).

Generally, the GO-PVDF composites described herein may be produced by dispersing and/or dissolving the graphene oxide and the PVDF in a solvent; and evaporating the solvent to yield a GO-PVDF composite. Evaporating may be at a temperature less than a boiling point+10° C. of the solvent ($T_{BP+10C}$ of the solvent). For example, the boiling point of dimethylformamide (DMF) is about 153° C. at about 1 bar of pressure. Accordingly, methods using DMF as the solvent at about 1 bar pressure may include evaporating at a temperature of less than about 163° C. Preferably, evaporating is at a temperature less than a boiling point of the solvent to mitigate disruption by bubble formation in the solvent.

FIG. 1 is a diagram of a nonlimiting method 100 of the present disclosure for producing a GO-PVDF composite 114. In this example, graphene oxide 102 and PVDF 104 are mixed 108 in a solvent 106 to yield a mixture 110. The PVDF 104 is preferably soluble in the solvent 106. The graphene oxide 102 is preferably dispersible, if not soluble to some degree, in the solvent 106.

The weight ratio of graphene oxide 102 to PVDF 104 in the mixture 110 is preferably the weight ratio in the desired GO-PVDF composite 114, which may be about 0.01:99.99 to about 10:90 (or about 0.01:99.99 to about 1:99, or about 1:99 to about 5:95, or about 5:95 to about 10:90).

The solvent 106 may be present in the mixture 110 at about 50 wt % to about 95 wt % (or about 50 wt % to about 75 wt %, or about 65 wt % to about 85 wt %, or about 75 wt % to about 95 wt %) based on a total weight of the mixture 110.

Examples of solvents 106 may include, but are not limited to, dimethylformamide (DMF), dimethylacetamide (DMAC), N-methyl-2-pyrrolidone (NMP), triethyl phosphate (TEP), dimethyl sulfoxide (DMSO), acetone, hexamethyl-phosphoramide (HMPA), and the like, and any combination thereof.

Mixing 108 the graphene oxide 102, the PVDF 104, and the solvent 106 may be achieved in one or more mixing steps and utilize a variety of mixing and/or dispersing methods. Mixing 108 may utilize mixing and/or dispersing methods that may include, but are not limited to, stirring, homogenizing, blending, sonicating, and the like, and any combination thereof.

For example, the components 202, 204, and 206 may all be placed in a container together and mixed 108.

In another example, the graphene oxide 102 may be dispersed in a portion of the solvent 106, and the PVDF 104 may be dissolved in another portion of the solvent 106. Then, the two mixtures may be combined to produce the mixture 110.

In yet another example, the graphene oxide 102 may be dispersed in the solvent 106 before adding the PVDF 104 to produce the mixture 110.

During mixing 108, heat may be used to aid in the dispersing and/or dissolving of components 102 and 104 in the solvent 106.

Once the mixture 110 is prepared, the solvent 108 may be evaporated 112 from the mixture 110. Preferably, this is performed slowly and with minimal agitation. Without being limited by theory, it is believed that agitation (e.g., caused by bubbles formed during boiling or refluxing) may cause the graphene oxide 102 to agglomerate or be a source for producing other inhomogeneities in the resultant GO-PVDF composite 114. Therefore, evaporation 112 may be preferably performed at a temperature less than a boiling point+10° C. of the solvent 108 ($T_{BP+10C}$ of the solvent) (more preferably below above the boiling point of the solvent 108) where avenues other than temperature are used to facilitate evaporation. For example, the pressure may be reduced. In another example, a gas stream may be flowed over the surface of the mixture. In both instances, the goal is to maintain a low partial pressure of solvent in the environment above the surface of the mixture and drive evaporation.

The GO-PVDF composite 114 may comprise about 1 wt % or less (or 0 wt % to about 1 wt %, or 0 wt % to about 0.5 wt %, or 0 wt % to about 0.1 wt %) of the solvent.

The GO-PVDF composite 114 may then be used as starting material for forming particles by cryogenic milling, melt emulsification, or other methods.

GO-PVDF Particles and Methods of Making

The GO-PVDF composites described herein may be included in the melt emulsion production of the GO-PVDF particles.

Figure 2:
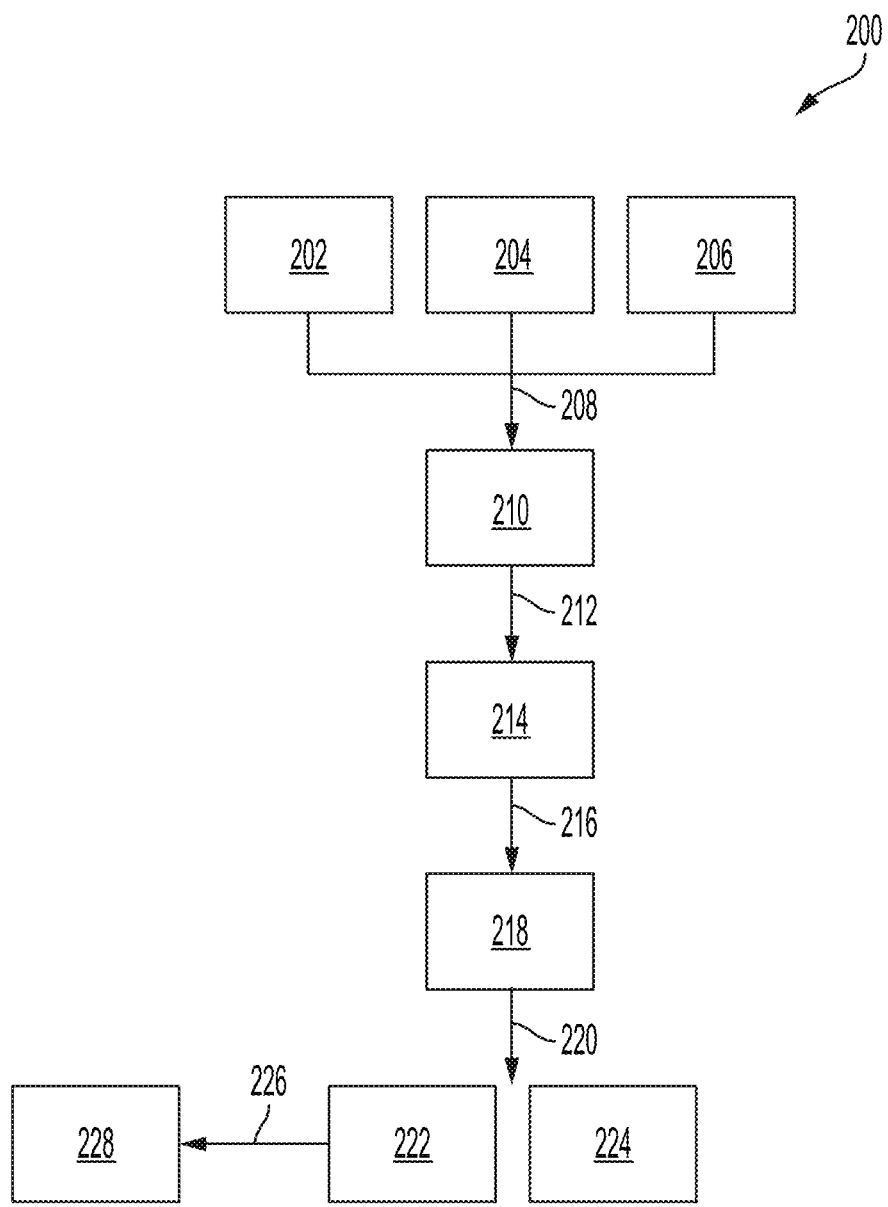
FIG. 2 is a flow chart of a nonlimiting example method of the present disclosure.

FIG. 2 is a flow chart of a nonlimiting example method 200 of the present disclosure. A GO-PVDF composite 202, a carrier fluid 204, and optionally emulsion stabilizer 206 are combined 208 to produce a mixture 210. The components 202, 204, and 206 can be added in any order and include mixing and/or heating during the process of combining 208 the components 202, 204, and 206.

The mixture 210 may then processed 212 by applying sufficiently high shear to the mixture 210 at a temperature equal to or greater than the melting point or softening temperature of the GO-PVDF composite 202 to form a melt emulsion 214. Because the temperature is above the melting point or softening temperature of the GO-PVDF composite 202, the PVDF of the GO-PVDF composite 202 becomes a polymer melt having the GO dispersed therein. The shear rate should be sufficient enough to disperse the polymer melt in the carrier fluid 204 as droplets (i.e., the polymer emulsion 214). Without being limited by theory, it is believed that, all other factors being the same, increasing shear should decrease the size of the droplets of the polymer melt in the carrier fluid 204. However, at some point there may be diminishing returns on increasing shear and decreasing droplet size or there may be disruptions to the droplet contents that decrease the quality of particles produced therefrom.

The melt emulsion 214 inside and/or outside the mixing vessel is then cooled 216 to produce cooled mixture 218 and solidify the polymer droplets into GO-PVDF particles 222 (also referred to as solidified GO-PVDF particles).

The cooled mixture 218 can then be treated 220 to isolate the GO-PVDF particles 222 from other components 224 (e.g., the carrier fluid 204 and excess emulsion stabilizer 206) and wash or otherwise purify the GO-PVDF particles 222. At least a portion of the emulsion stabilizer 206, when included, may coat the outer surface of the GO-PVDF particles 222. Emulsion stabilizers 206, or a portion thereof, may be deposited as coating, perhaps a uniform coating, on the GO-PVDF particles 222. In some instances, which may be dependent upon non-limiting factors such as the temperature (including cooling rate) and the types and sizes of emulsion stabilizers 206, the nanoparticles of emulsion stabilizers 206 may become at least partially embedded within the outer surface of the GO-PVDF particles 222. Even without embedment taking place, at least a portion of the nanoparticles within emulsion stabilizers 206 may remain robustly associated with the GO-PVDF particles 222 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

The GO-PVDF particles 222 may optionally be further purified 226 (described in more detail below) to yield purified GO-PVDF particles 228.

The carrier fluid 204 should be chosen such that at the various processing temperatures (e.g., from room temperature to process temperature) the GO-PVDF composite 202 and carrier fluid 204 are immiscible. An additional factor that may be considered is the differences in (e.g., a difference or a ratio of) viscosity at process temperature between the molten GO-PVDF composite and the carrier fluid 204. The differences in viscosity may affect droplet breakup and particle size distribution. Without being limited by theory, it is believed that when the viscosities and/or hydrophobicities of the molten GO-PVDF composite and the carrier fluid 204 are too similar, the circularity of the product as a whole may be reduced where the particles are more ovular and more elongated structures are observed.

Suitable carrier fluids 204 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 204 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 204 comprises two or more of the foregoing, the carrier fluid 204 may have one or more phases. For example, polysiloxanes modified with fatty acids and polysiloxanes modified with fatty alcohols (preferably with similar chain lengths for the fatty acids and fatty alcohols) may form a single-phase carrier fluid 204. In another example, a carrier fluid 204 comprising a silicone oil and an alkyl-terminal polyethylene glycol may form a two-phase carrier fluid 204. Preferably, the carrier fluid 204 is polar and has a hydrophobicity different than the PVDF of the GO-PVDF composite 114.

The carrier fluid 204 may be present in the mixture 210 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the GO-PVDF composite 202 and carrier fluid 204 combined.

In some instances, the carrier fluid 204 may have a density of about 0.6 g/cm$^3$ to about 1.5 g/cm$^3$, and the GO-PVDF composite 202 has a density of about 0.7 g/cm$^3$ to about 1.7 g/cm$^3$, wherein the thermoplastic polymer has a density similar, lower, or higher than the density of the carrier fluid.

The emulsion stabilizers 206 used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may be hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

Nanoparticles may be included in the mixture 210 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the GO-PVDF composite 202.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 210 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the GO-PVDF composite 202. Alternatively, the mixture 210 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 202, 204, and 206 can be added in any order and include mixing and/or heating during the process of combining 208 the components 202, 204, and 206. For example, the emulsion stabilizer 206 may first be dispersed in the carrier fluid 204, optionally with heating said dispersion, before adding the GO-PVDF composite 202. In another nonlimiting example, the GO-PVDF composite 202 may be heated to produce a polymer melt to which the carrier fluid 204 and emulsion stabilizer 206 are added together or in either order. In yet another nonlimiting example, the GO-PVDF composite 202 and carrier fluid 204 can be mixed at a temperature equal to or greater than the melting point or softening temperature of the PVDF of the GO-PVDF composite 202 and at a shear rate sufficient enough to disperse the thermoplastic polymer melt in the carrier fluid 204. Then, the emulsion stabilizer 206 can be added to form the mixture 210 and maintained at suitable process conditions for a set period of time.

Combining 208 the components 202, 204, and 206 in any combination can occur in a mixing apparatus used for the processing 212 and/or another suitable vessel. By way of nonlimiting example, the GO-PVDF composite 202 may be heated to a temperature equal to or greater than the melting point or softening temperature of the PVDF of the GO-PVDF composite 202 in the mixing apparatus used for the processing 212, and the emulsion stabilizer 206 may be dispersed in the carrier fluid 204 in another vessel. Then, said dispersion may be added to the melt of GO-PVDF composite 202 in the mixing apparatus used for the processing 212.

The mixing apparatuses used for the processing 212 to produce the melt emulsion 214 should be capable of maintaining the melt emulsion 214 at a temperature equal to or greater than the melting point or softening temperature of the PVDF of the GO-PVDF composite 202 and applying a shear rate sufficient to disperse the polymer melt in the carrier fluid 204 as droplets.

Examples of mixing apparatuses used for the processing 212 to produce the melt emulsion 214 include, but are not limited to, extruders (e.g., continuous extruders, batch extruders, and the like), stirred reactors, blenders, reactors with inline homogenizer systems, and the like, and apparatuses derived therefrom.

Processing 212 and forming the melt emulsion 214 at suitable process conditions (e.g., temperature, shear rate, and the like) for a set period of time.

The temperature of processing 212 and forming the melt emulsion 214 should be a temperature equal to or greater than the melting point or softening temperature of the PVDF of the GO-PVDF composite 202 and less than the decomposition temperature of any components 202, 204, and 206 in the mixture 210. For example, the temperature of processing 212 and forming the melt emulsion 214 may be about 1° C. to about 50° C. (or about 1° C. to about 25° C., or about 5° C. to about 30° C., or about 20° C. to about 50° C.) greater than the melting point or softening temperature of the PVDF of the GO-PVDF composite 202 provided the temperature of processing 212 and forming the melt emulsion 214 is less than the decomposition temperature of any components 202, 204, and 206 in the mixture 210.

The shear rate of processing 212 and forming the melt emulsion 214 should be sufficiently high to disperse the polymer melt in the carrier fluid 204 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 212 and forming the melt emulsion 214 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 212 can be stopped. That time may depend on, among other things, the temperature, shear rate, GO-PVDF composite 202 composition, the carrier fluid 204 composition, and the emulsion stabilizer 206 composition.

The melt emulsion 214 may then be cooled 216. Cooling 216 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling 216, little to no shear may be applied to the melt emulsion 214. In some instances, the shear applied during heating may be applied during cooling.

The cooled mixture 218 resulting from cooling 216 the melt emulsion 214 comprises solidified GO-PVDF particles 222 and other components 224 (e.g., the carrier fluid 204, excess emulsion stabilizer 206, and the like). The GO-PVDF particles 222 may be dispersed in the carrier fluid or settled in the carrier fluid.

The cooled mixture 218 may then be treated 220 to the separate the GO-PVDF particles 222 from the other components 224. Suitable treatments include, but are not limited to, washing, filtering, centrifuging, decanting, and the like, and any combination thereof.

Solvents used for washing the GO-PVDF particles 222 should generally be (a) miscible with the carrier fluid 204 and (b) nonreactive (e.g., non-swelling and non-dissolving) with the GO-PVDF composite 202. The choice of solvent will depend on, among other things, the composition of the carrier fluid and the composition of the GO-PVDF composite 202.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the GO-PVDF particles 222 by drying using an appropriate method such as air-drying, heat-drying, reduced pressure drying, freeze drying, or a hybrid thereof. The heating may be performed preferably at a temperature lower than the glass transition point of the thermoplastic polymer (e.g., about 50° C. to about 150° C.).

Advantageously, carrier fluids and washing solvents of the systems and methods described herein (e.g., method 200) can be recycled and reused. One skilled in the art will recognize any necessary cleaning of used carrier fluid and solvent necessary in the recycling process.

The GO-PVDF particles 222 after separation from the other components 224 may optionally be further purified 226. For example, to narrow the particle size distribution (or reduce the diameter span), the GO-PVDF particles 222 can be passed through a sieve having a pore size of about 10 μm to about 250 μm (or about 10 μm to about 100 μm, or about 50 μm to about 200 μm, or about 150 μm to about 250 μm).

In another example purification technique, the GO-PVDF particles 222 may be washed with water to remove surfactant while maintaining substantially all of the nanoparticles associated with the surface of the GO-PVDF particles 222. In yet another example purification technique, the GO-PVDF particles 222 may be blended with additives to achieve a desired final product. For clarity, because such additives are blended with the GO-PVDF particles 222 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the GO-PVDF particles 222 may be unwanted in downstream applications. Accordingly, yet another example purification technique may include at least substantial removal of the surfactant from the GO-PVDF particles 222 (e.g., by washing and/or pyrolysis).

The GO-PVDF particles 222 and/or purified GO-PVDF particles 228 (referred to as GO-PVDF particles 222/228) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the GO-PVDF particles 222/228 is, in general when emulsion stabilizers are used, includes emulsion stabilizers (a) dispersed on an outer surface of the GO-PVDF particles 222/228 and/or (b) embedded in an outer portion (e.g., outer 1 vol %) of the GO-PVDF particles 222/228.

Further, where voids form inside the polymer melt droplets, emulsion stabilizers 206 should generally be at (and/or embedded in) the interface between the interior of the void and the thermoplastic polymer. The voids generally do not contain the thermoplastic polymer. Rather, the voids may contain, for example, carrier fluid, air, or be void. The GO-PVDF particles 222/228 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the GO-PVDF particles 222/228.

The GO-PVDF composite 202 may be present in the GO-PVDF particles 222/228 at about 90 wt % to about 99.5 wt % (or about 90 wt % to about 95 wt %, or about 92 wt % to about 97 wt %, or about 95 wt % to about 99.5 wt %) of the GO-PVDF particles 222/228.

When included, the emulsion stabilizers 206 may be present in the GO-PVDF particles 222/228 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the GO-PVDF particles 222/228. When purified to at least substantially remove surfactant or another emulsion stabilizer, the emulsion stabilizers 206 may be present in the particles 130/136 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the GO-PVDF particles 222/228. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 206 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the GO-PVDF particles 222/228. When purified to at least substantially remove surfactant or another emulsion stabilizer, the emulsion stabilizers 206 may be present in the particles 130/136 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 130/136. The coverage of the emulsion stabilizers 206 on an outer surface of the GO-PVDF particles 222/228 may be determined using image analysis of the scanning electron microscope images (SEM micrographs). The emulsion stabilizers 206 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the GO-PVDF particles 222/228. When purified to at least substantially remove surfactant or another emulsion stabilizer, the emulsion stabilizers 206 may be present in the particles 130/136 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 130/136. The coverage of the emulsion stabilizers 206 on an outer surface of the GO-PVDF particles 222/228 may be determined using image analysis of the SEM micrographs.

The GO-PVDF particles 222/228 comprise graphene oxide dispersed in PVDF and a transmission FTIR minimum transmittance ratio of β-phase PVDF to α-phase PVDF of about 1 or less (or about 0.9 or less, or about 0.8 or less, or about 0.7 or less, or about 0.6 or less, or about 0.5 or less, or 0 to about 1, or 0 to about 0.9, or 0 to about 0.8, or 0 to about 0.7, or 0 to about 0.6, or 0 to about 0.5). The GO-PVDF particles 222/228 may have a β-phase retention from the GO-PVDF composite 202 (the transmission FTIR minimum transmittance ratio of β-phase PVDF for the GO-PVDF composite 202 divided by transmission FTIR minimum transmittance ratio of β-phase PVDF of the GO-PVDF particles 222/228) of about 0.1 to about 1.5 (or about 0.1 to about 0.5, or about 0.3 to about 0.7, or about 0.5 to about 0.9, or about 0.7 to about 1.3, or about 0.9 to about 1.5).

The GO-PVDF particles 222/228 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D900. The GO-PVDF particles 222/228 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow.

In a first nonlimiting example, the GO-PVDF particles 222/228 may have a D10 of about 0.1 μm to about 10 μm, a D50 of about 0.5 μm to about 25 μm, and a D90 of about 3 μm to about 50 μm, wherein D10<D50<D90. Said GO-PVDF particles 222/228 may have a diameter span of about 0.2 to about 2.

In a second nonlimiting example, the GO-PVDF particles 222/228 may have a D10 of about 5 μm to about 30 μm, a D50 of about 30 μm to about 70 μm, and a D90 of about 70 μm to about 120 μm, wherein D10<D50<D90. Said GO-PVDF particles 222/228 may have a diameter span of about 1.0 to about 2.5.

In a third nonlimiting example, the GO-PVDF particles 222/228 may have a D10 of about 25 μm to about 60 μm, a D50 of about 60 μm to about 110 μm, and a D90 of about 110 μm to about 175 μm, wherein D10<D50<D90. Said GO-PVDF particles 222/228 may have a diameter span of about 0.6 to about 1.5.

In a fourth nonlimiting example, the GO-PVDF particles 222/228 may have a D10 of about 75 μm to about 125 μm, a D50 of about 100 μm to about 200 μm, and a D90 of about 125 μm to about 300 μm, wherein D10<D50<D90. Said GO-PVDF particles 222/228 may have a diameter span of about 0.2 to about 1.2.

In a fifth nonlimiting example, the GO-PVDF particles 222/228 may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The GO-PVDF particles 222/228 may also have a diameter span of about 0.4 to about 3 (or about 0.6 to about 2, or about 0.4 to about 1.5, or about 1 to about 3).

The GO-PVDF particles 222/228 may have a circularity of about 0.9 or greater (or about 0.90 to about 1.0, or about 0.93 to about 0.99, or about 0.95 to about 0.99, or about 0.97 to about 0.99, or about 0.98 to 1.0).

The GO-PVDF particles 222/228 may have an angle of repose of about 25° to about 45° (or about 25° to about 35°, or about 30° to about 40°, or about 35° to about 45°).

The GO-PVDF particles 222/228 may have a Hausner ratio of about 1.0 to about 1.5 (or about 1.0 to about 1.2, or about 1.1 to about 1.3, or about 1.2 to about 1.35, or about 1.3 to about 1.5).

The GO-PVDF particles 222/228 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The GO-PVDF particles 222/228 may have an aerated density of about 0.5 g/cm$^3$ to about 0.8 g/cm$^3$ (or about 0.5 g/cm$^3$ to about 0.7 g/cm$^3$, or about 0.55 g/cm$^3$ to about 0.80 g/cm$^3$).

The GO-PVDF particles 222/228 may have a tapped density of about 0.6 g/cm$^3$ to about 0.9 g/cm$^3$ (or about 0.60 g/cm$^3$ to about 0.75 g/cm$^3$, or about 0.65 g/cm$^3$ to about 0.80 g/cm$^3$, or about 0.70 g/cm$^3$ to about 0.90 g/cm$^3$).

Depending on the temperature and shear rate of processing 212 and the composition and relative concentrations of the components 202, 204, and 206, different shapes of the structures that compose the GO-PVDF particles 222/228 have been observed. Typically, the GO-PVDF particles 222/228 comprise substantially spherical particles (having a circularity of about 0.97 or greater). However, other structures including disc and elongated structures have been observed in the GO-PVDF particles 222/228. Therefore, the GO-PVDF particles 222/228 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The GO-PVDF particles 222/228 may have a sintering window that is within 10° C., preferably within 5° C., of the sintering window of the PVDF used to produce the GO-PVDF composite.

Applications of GO-PVDF Particles

The GO-PVDF particles described herein may be used to produce a variety of articles. By way of nonlimiting example, 3-D printing processes of the present disclosure may comprise: depositing GO-PVDF particles described herein (optionally in combination with thermoplastic polymer particles) upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the GO-PVDF particles (and thermoplastic polymer particles, when included) may take place in a 3-D printing apparatus employing a laser, such that heating and consolidation take place by selective laser sintering.

Consolidated bodies (or portions thereof) formed from the GO-PVDF particles described herein may have a transmission FTIR minimum transmittance ratio of β-phase PVDF to α-phase PVDF of about 1 or less (or about 0.9 or less, or about 0.8 or less, or about 0.7 or less, or about 0.6 or less, or about 0.5 or less, or 0 to about 1, or 0 to about 0.9, or 0 to about 0.8, or 0 to about 0.7, or 0 to about 0.6, or 0 to about 0.5). Consolidated bodies (or portions thereof) formed from the GO-PVDF particles described herein may have a β-phase retention from the GO-PVDF composite 202 (the transmission FTIR minimum transmittance ratio of β-phase PVDF for the GO-PVDF particles divided by transmission FTIR minimum transmittance ratio of β-phase PVDF of the consolidated bodies or portions thereof) of about 0.1 to about 1.5 (or about 0.1 to about 0.5, or about 0.3 to about 0.7, or about 0.5 to about 0.9, or about 0.7 to about 1.3, or about 0.9 to about 1.5).

Examples of thermoplastic polymers that may be at least a portion of the thermoplastic polymer particles that may be used in the foregoing method include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

Examples of articles that may be produced by such methods where the GO-PVDF particles may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, engine knock sensors, pressure sensors, sonar equipment, diesel fuel injectors, fast response solenoids, optical adjustment, ultrasonic cleaning, ultrasonic welding, piezoelectric motors, stack actuators, stripe actuators, piezoelectric relays, ultrasound imaging equipment, piezoelectric printers (inkjet), piezoelectric speakers (cell phones, ear buds, sound-producing toys, musical greeting cards, etc.), piezoelectric buzzers (intruder alarms, medical devices, PIN pads, key fobs, alarm clocks, wristwatch alarms, fire alarms, CO detectors, exercise equipment, microwave ovens, computer motherboards, ultrasonic insect and rodent repellers, ultrasonic pet training collars), piezoelectric humidifiers, electronic toothbrushes, microphones, piezoelectric ignitors, electricity generation, microelectronic mechanical systems (MEMS), tennis racquets (integrates piezoelectric fibers into the throat of a tennis racquet along with a microcontroller in the handle), micro robotics, course-changing ammunition, and the like. Further, particles may be useful in applications that include, but are not limited to, paints, powder coatings, ink jet materials, electrophotographic toners, 3D printing, and the like.

Advantageously, objects or portions thereof produced using the GO-PVDF particles described herein may have a piezoelectric response.

Example Embodiments

A first nonlimiting example embodiment is a method comprising: providing a graphene oxide-polyvinylidene fluoride (GO-PVDF) composite comprising graphene oxide dispersed in polyvinylidene fluoride (PVDF), wherein the GO-PVDF composite has a transmission FTIR minimum transmittance ratio of β-phase PVDF to α-phase PVDF of about 1 or less; mixing a mixture comprising a GO-PVDF composite, a carrier fluid that is immiscible with the PVDF, and optionally an emulsion stabilizer (e.g., the mixture may comprise the emulsion stabilizer or the mixture may not comprise (or be absent of) the emulsion stabilizer) at a temperature equal to or greater than a melting point or softening temperature of the PVDF (e.g., and at a shear rate sufficiently high) to disperse the GO-PVDF composite in the carrier fluid; cooling the mixture to below the melting point or softening temperature of the PVDF to form GO-PVDF particles; and separating the GO-PVDF particles from the carrier fluid, wherein the GO-PVDF particles comprise the graphene oxide dispersed in the PVDF, and wherein the GO-PVDF particles have a transmission FTIR minimum transmittance ratio of β-phase PVDF to α-phase PVDF of about 1 or less. The first nonlimiting example embodiment may further comprise one or more of: Element 1: further comprising: producing a mixture comprising the graphene oxide, the PVDF, and a solvent; and evaporating the solvent from the mixture to yield the GO-PVDF composite that comprises about 1 wt % or less of the solvent; Element 2: Element 1 and wherein evaporating is at a temperature less than a boiling point+10° C. of the solvent ($T_{BP+10C}$ of the solvent); Element 3: Element 1 and wherein evaporating comprises heating the mixture to a temperature less than a boiling point+10° C. of the solvent ($T_{BP+10C}$ of the solvent), and passing a gas over a surface of the mixture; Element 4: Element 1 and wherein evaporating comprises exposing the mixture to a reduced air pressure; and heating the mixture to a temperature less than a boiling point+10° C. of the solvent ($T_{BP+10C}$ of the solvent) at the reduced air pressure; Element 5: Element 1 and wherein producing the mixture comprises dispersing the graphene oxide in the solvent; and dissolving the PVDF in the solvent having the graphene oxide dispersed therein; Element 6: wherein the GO-PVDF particles have a D10 of about 0.1 µm to about 125 µm, a D50 of about 0.5 µm to about 200 µm, and a D90 of about 3 µm to about 300 µm, wherein D10<D50<D90; Element 7: wherein the GO-PVDF particles have a diameter span of about 0.2 to about 10; Element 8: wherein the GO-PVDF particles have a circularity of about 0.90 to about 1.0; and Element 9: wherein the GO-PVDF particles have a Hausner ratio of about 1.0 to about 1.5. Examples of combinations include, but are not limited to, Element 1 in combination with one or more of Elements 2-5; Element 1 (optionally in combination with one or more of Elements 2-5) in combination with one or more of Elements 6-9; and two or more of Elements 6-9 in combination.

A second nonlimiting example embodiment is a method comprising: producing a mixture comprising graphene oxide, PVDF, and a solvent; and evaporating the solvent from the mixture to yield a GO-PVDF composite that comprises about 1 wt % or less of the solvent, wherein evaporating is a temperature less than a boiling point+10° C. of the solvent ($T_{BP+10C}$ of the solvent), and wherein the GO-PVDF composite has a transmission FTIR minimum transmittance ratio of β-phase PVDF to α-phase PVDF of about 1 or less. The second nonlimiting example embodiment may further comprise one or more of: Element 10: wherein evaporating comprises heating a mixture of the graphene oxide and the PVDF dissolved in the solvent to the $T_{BP+10C}$ of the solvent, and passing a gas over a surface of the mixture; Element 11: wherein evaporating comprises exposing a mixture of the graphene oxide and the PVDF dissolved in the solvent to a reduced air pressure; and heating the mixture to the $T_{BP+10C}$ of the solvent and at the reduced air pressure; Element 12: wherein producing the mixture comprises dispersing the graphene oxide in the solvent; and dissolving the PVDF in the solvent having the graphene oxide dispersed therein; Element 13: the method further comprising: melt emulsifying the GO-PVDF composite to produce GO-PVDF particles, wherein the GO-PVDF particles have a β-phase retention from the GO-PVDF composite of about 0.1 to about 1.5; Element 14: wherein a weight ratio of graphene oxide to PVDF in the mixture is about 0.01:99.99 to about 10:90; and Element 15: wherein the solvent is selected from the group consisting of: dimethylformamide (DMF), dimethylacetamide (DMAC), N-methyl-2-pyrrolidone (NMP), triethyl phosphate (TEP), dimethyl sulfoxide (DMSO), acetone, hexamethyl-phosphoramide (HMPA), and any combination thereof.

A third nonlimiting example embodiment is a composition comprising: graphene oxide-polyvinylidene fluoride (GO-PVDF) particles comprising graphene oxide dispersed in polyvinylidene fluoride (PVDF), wherein the GO-PVDF particles have a transmission FTIR minimum transmittance ratio of β-phase PVDF to α-phase PVDF of about 1 or less. The third nonlimiting example embodiment may further comprise one or more of: Element 16: wherein the GO-PVDF particles have an aerated density of about 0.55 g/cm³ to about 0.8 g/cm³; Element 17: wherein the GO-PVDF particles have a circularity of about 0.90 to about 1.0; Element 18: wherein the GO-PVDF particles have an angle of repose of about 25° to about 45°; Element 19: wherein the GO-PVDF particles have a Hausner ratio of about 1.0 to about 1.5; Element 20: wherein the GO-PVDF particles have a D10 of about 0.1 µm to about 125 µm, a D50 of about 0.5 µm to about 200 µm, and a D90 of about 3 µm to about 300 µm, wherein D10<D50<D90; Element 21: wherein the GO-PVDF particles have a diameter span of about 0.2 to about 10; Element 22: wherein the GO-PVDF particles have an aerated density of about 0.5 g/cm³ (or about 0.6 g/cm³) to about 0.8 g/cm³; Element 23: wherein the GO-PVDF particles have a bulk density of about 0.3 g/cm³ to about 0.8 g/cm³; Element 24: wherein the GO-PVDF particles have a tapped density of about 0.6 g/cm³ to about 0.9 g/cm³; Element 25: wherein the GO-PVDF particles have a BET surface area of about 10 m²/g to about 500 m²/g; Element 26: wherein the GO-PVDF particles further comprise an emulsion stabilizer covering at least a portion of a surface of the GO-PVDF particles; Element 27: wherein the GO-PVDF particles further comprise a nanoparticle emulsion stabilizer embedded in a surface of the GO-PVDF particles; Element 28: wherein the GO-PVDF particles further comprise a thermoplastic that is not PVDF; and Element 29: wherein the GO-PVDF particles do not comprise an emulsion stabilizer and/or a flow aid. Examples of combinations include, but are not limited to, Element 16 in combination with one or more of Elements 17-28; Element 16 in combination with one or more of Elements 17-28; Element 17 in combination with one or more of Elements 18-28; Element 18 in combination with one or more of Elements 19-28; Element 19 in combination with one or more of Elements 20-28; Element 20 in combination with one or more of Elements 21-28; Element 21 in combination with one or more of Elements 22-28; Element 22 in combination with one or more of Elements 23-28; Element 23 in combination with one or more of Elements 24-28; Element 24 in combination with one or more of Elements 25-28; Element 25 in combination with one or more of Elements 26-28; two or more of Elements 26-28 in combination; Element 28 and 29 in combination and optionally in further combination with one or more of Elements 17-24; and Element 28 in combination with one or more of Elements 17-24.

A fourth nonlimiting example embodiment is a method comprising: depositing, upon a surface, the GO-PVDF particles of the third nonlimiting example embodiment optionally in combination with thermoplastic polymer particles; and once deposited, heating at least a portion of the particles to promote consolidation thereof and form a consolidated body, wherein the consolidated body has a β-phase retention from the GO-PVDF particles of about 0.1 to about 1.5.

CLAUSES

Clause 1. A method comprising: providing a graphene oxide-polyvinylidene fluoride (GO-PVDF) composite comprising graphene oxide dispersed in polyvinylidene fluoride (PVDF), wherein the GO-PVDF composite has a transmission FTIR minimum transmittance ratio of β-phase PVDF to α-phase PVDF of about 1 or less; mixing a mixture comprising a GO-PVDF composite, a carrier fluid that is immiscible with the PVDF, and optionally an emulsion stabilizer at a temperature equal to or greater than a melting point or softening temperature of the PVDF (e.g., and at a shear rate sufficiently high) to disperse the GO-PVDF composite in the carrier fluid; cooling the mixture to below the melting point or softening temperature of the PVDF to form GO-PVDF particles; and separating the GO-PVDF particles from the carrier fluid, wherein the GO-PVDF particles comprise the graphene oxide dispersed in the PVDF, and wherein the GO-PVDF particles have a transmission FTIR minimum transmittance ratio of β-phase PVDF to α-phase PVDF of about 1 or less.

Clause 2. The method of Clause 1 further comprising: producing a mixture comprising the graphene oxide, the PVDF, and a solvent; and evaporating the solvent from the mixture to yield the GO-PVDF composite that comprises about 1 wt % or less of the solvent.

Clause 3. The method of Clause 2, wherein evaporating is at a temperature less than a boiling point+10° C. of the solvent ($T_{BP+10C}$ of the solvent) (preferably at a temperature less than the boiling point of the solvent).

Clause 4. The method of Clause 2, wherein evaporating comprises heating the mixture to at a temperature less than a boiling point+10° C. of the solvent ($T_{BP+10C}$ of the solvent) (preferably at a temperature less than the boiling point of the solvent), and passing a gas over a surface of the mixture.

Clause 5. The method of Clause 2, wherein evaporating comprises exposing the mixture to a reduced air pressure; and heating the mixture to at a temperature less than a boiling point+10° C. of the solvent ($T_{BP+10C}$ of the solvent) (preferably at a temperature less than the boiling point of the solvent) and at the reduced air pressure.

Clause 6. The method of Clause 2, wherein producing the mixture comprises dispersing the graphene oxide in the solvent; and dissolving the PVDF in the solvent having the graphene oxide dispersed therein.

Clause 7. The method of Clause 1, wherein the GO-PVDF particles have a D10 of about 0.1 μm to about 125 μm, a D50 of about 0.5 μm to about 200 μm, and a D90 of about 3 μm to about 300 μm, wherein D10<D50<D90.

Clause 8. The method of Clause 1, wherein the GO-PVDF particles have a diameter span of about 0.2 to about 10.

Clause 9. The method of Clause 1, wherein the GO-PVDF particles have a circularity of about 0.90 to about 1.0.

Clause 10. The method of Clause 1, wherein the GO-PVDF particles have a Hausner ratio of about 1.0 to about 1.5.

Clause 11. The method of Clause 1, wherein the mixture does not comprise an emulsion stabilizer.

Clause 12. A method comprising: producing a mixture comprising graphene oxide, PVDF, and a solvent; and evaporating the solvent from the mixture to yield a GO-PVDF composite that comprises about 1 wt % or less of the solvent, wherein evaporating is at a temperature less than a boiling point+10° C. of the solvent ($T_{BP+10C}$ of the solvent) (preferably at a temperature less than the boiling point of the solvent), and wherein the GO-PVDF composite has a transmission FTIR minimum transmittance ratio of β-phase PVDF to α-phase PVDF of about 1 or less.

Clause 13. The method of Clause 12, wherein evaporating comprises heating a mixture of the graphene oxide and the PVDF dissolved in the solvent to the $T_{BP+10C}$ of the solvent, and passing a gas over a surface of the mixture.

Clause 14. The method of Clause 12, wherein evaporating comprises exposing a mixture of the graphene oxide and the PVDF dissolved in the solvent to a reduced air pressure; and heating the mixture to the temperature less than the $T_{BP+10C}$ of the solvent at the reduced air pressure.

Clause 15. The method of Clause 12, wherein producing the mixture comprises dispersing the graphene oxide in the solvent; and dissolving the PVDF in the solvent having the graphene oxide dispersed therein.

Clause 16. The method of Clause 12 further comprising: melt emulsifying the GO-PVDF composite to produce GO-PVDF particles, wherein the GO-PVDF particles have a β-phase retention from the GO-PVDF composite of about 0.1 to about 1.5.

Clause 17. The method of Clause 12, wherein a weight ratio of graphene oxide to PVDF in the mixture is about 0.01:99.99 to about 10:90.

Clause 18. The method of Clause 12, wherein the solvent is selected from the group consisting of: dimethylformamide (DMF), dimethyl acetamide (DMAC), N-methyl-2-pyrrolidone (NMP), triethyl phosphate (TEP), dimethyl sulfoxide (DMSO), acetone, hexamethyl-phosphoramide (HMPA), and any combination thereof.

Clause 19. The method of Clause 12, wherein an emulsion stabilizer is not present during the melt emulsifying.

Clause 20. A composition comprising: graphene oxide-polyvinylidene fluoride (GO-PVDF) particles comprising graphene oxide dispersed in polyvinylidene fluoride (PVDF), wherein the GO-PVDF particles have a transmission FTIR minimum transmittance ratio of β-phase PVDF to α-phase PVDF of about 1 or less.

Clause 21. The composition of Clause 20, wherein the GO-PVDF particles have an aerated density of about 0.55 g/cm$^3$ to about 0.8 g/cm$^3$.

Clause 22. The composition of Clause 20, wherein the GO-PVDF particles have a circularity of about 0.90 to about 1.0.

Clause 23. The composition of Clause 20, wherein the GO-PVDF particles have an angle of repose of about 25° to about 45°.

Clause 24. The composition of Clause 20, wherein the GO-PVDF particles have a Hausner ratio of about 1.0 to about 1.5.

Clause 25. The composition of Clause 20, wherein the GO-PVDF particles have a D10 of about 0.1 μm to about 125 μm, a D50 of about 0.5 μm to about 200 μm, and a D90 of about 3 μm to about 300 μm, wherein D10<D50<D90.

Clause 26. The composition of Clause 20, wherein the GO-PVDF particles have a diameter span of about 0.2 to about 10.

Clause 27. The composition of Clause 20, wherein the GO-PVDF particles have an aerated density of about 0.5 g/cm$^3$ (or about 0.6 g/cm$^3$) to about 0.8 g/cm$^3$.

Clause 28. The composition of Clause 20, wherein the GO-PVDF particles have a bulk density of about 0.3 g/cm$^3$ to about 0.8 g/cm$^3$.

Clause 29. The composition of Clause 20, wherein the GO-PVDF particles have a tapped density of about 0.6 g/cm$^3$ to about 0.9 g/cm$^3$.

Clause 30. The composition of Clause 20, wherein the GO-PVDF particles have a BET surface area of about 10 m$^2$/g to about 500 m$^2$/g.

Clause 31. The composition of Clause 20, wherein the GO-PVDF particles further comprise an emulsion stabilizer covering at least a portion of a surface of the GO-PVDF particles.

Clause 32. The composition of Clause 20, wherein the GO-PVDF particles further comprise a nanoparticle emulsion stabilizer embedded in a surface of the GO-PVDF particles.

Clause 33. The composition of Clause 20, wherein the GO-PVDF particles further comprise a thermoplastic that is not PVDF.

Clause 34. The composition of Clause 20, wherein the GO-PVDF particles do not comprise a flow aid.

Clause 35. A method comprising: depositing, upon a surface, the GO-PVDF particles of Clause 20 optionally in combination with thermoplastic polymer particles; and once deposited, heating at least a portion of the particles to promote consolidation thereof and form a consolidated body, wherein the consolidated body has a β-phase retention from the GO-PVDF particles of about 0.1 to about 1.5.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. (Comparative Example) Spherical PVDF powder (average diameter of about 200 nm) and graphene oxide powder (average diameter of about 0.5 microns to about 3 microns, average thickness of about 0.55 nm to about 1.2 nm) were mixed together in ethanol. The interaction of PVDF and graphene oxide was enhanced through ultrasonication (about 2 hours) and mechanical stirring (about 10 hours). The final product was believed to be a nanosized composite where the interaction between the PVDF and graphene oxide is strictly physical adhesion via surface layering of the graphene oxide on the PVDF powder particles. The size of the powder was not suitable for SLS additive manufacturing methods.

Example 2. (Comparative Example) Polyethylene glycol (PEG) (molecular weight per Table 1, available from SigmaAldrich) and PVDF (KYNAR® 710, available from Arkema) in weight ratios per Table 1 were added to a glass reactor (size per Table 1) equipped with P4 impeller and $N_2$ flow. In some experiments (per Table 1), an emulsion stabilizer (AEROSIL® R812S) was added to the mixture at 1 wt % based on the total weight of the PVDF combined. The mixture was heated to about 220° C., and the mixing was slowly ramped to about 500 RPM. The mixture was stirred at about 220° C. for about 35 minutes. After heating for about 35 minutes, the heating mantle was removed, the mixing was stopped, and the slurry was allowed to cool slowly to room temperature. The slurry was then diluted with methanol and filtered. The resulting PVDF particles were subsequently washed 3 times with methanol. After drying overnight under vacuum, the PVDF particles were filtered with a 150 micron sieve. Table 1 provides additional details of the preparation conditions. Table 2 provide properties of the resultant PVDF particles.

TABLE 1

PVDF Particle Preparation Conditions

| Sample | Reactor Size | PEG MW (kDa) | Emulsion Stabilizer (relative to PVDF) | Wt Ratio PVDF to PEG |
|---|---|---|---|---|
| 1 | 0.5 L | 20 | 1 wt % | 20:80 |
| 2 | 0.5 L | 20 | 1 wt % | 30:70 |
| 3 | 0.5 L | 20 | 1 wt % | 40:60 |
| 4 | 1 L | 20 | 1 wt % | 25:75 |
| 5 | 1 L | 35 | 1 wt % | 25:75 |
| 6 | 0.5 L | 35 | none | 25:75 |
| 7 | 0.5 L | 20 | none | 25:75 |
| 8 | 2 L | 20 | none | 25:75 |

TABLE 2

PVDF Particle Properties

| Sample | D10 (microns) | D50 (microns) | D90 (microns) | Span | Angle of Repose (°) |
|---|---|---|---|---|---|
| 1 | 16.1 | 34.1 | 64.1 | 1.4 | not tested |
| 2 | 31.4 | 74.6 | 175 | 1.9 | not tested |
| 3 | 143 | 218 | 317 | 0.8 | not tested |
| 4 | 41.4 | 64.0 | 99.0 | 0.9 | not tested |
| 5 | 17.9 | 35.3 | 69.8 | 2.1 | not tested |
| 6 | 7.8 | 18.7 | 63.7 | 3.6 | not tested |
| 7 | 47.7 | 69.7 | 101 | 0.8 | 28.8 |
| 8 | 42.0 | 56.6 | 75.6 | 0.6 | 27.7 |

The flow of PVDF particles without the emulsion stabilizer (Samples 7 and 8) was excellent.

Figure 3A:
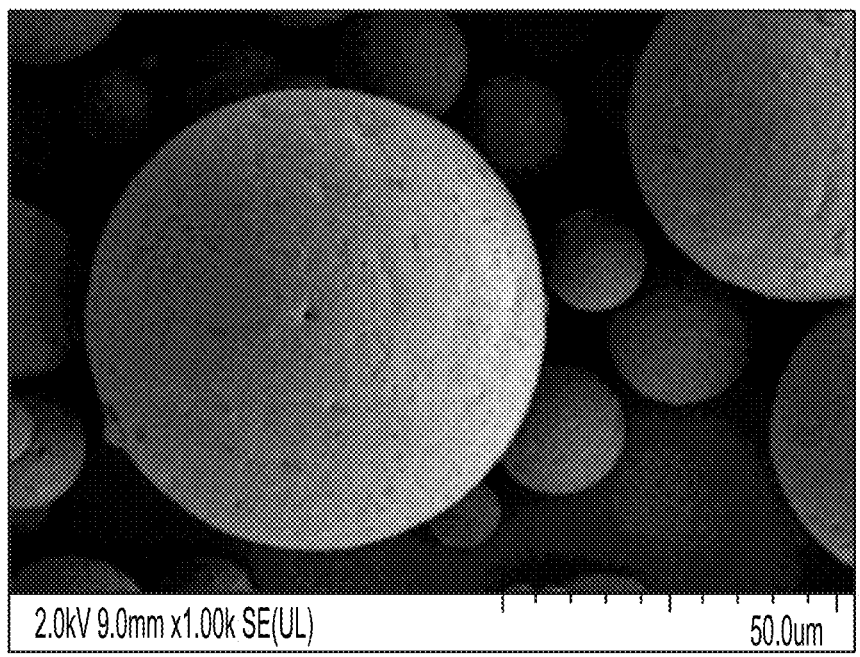
FIGS. 3A and 3B are scanning electron microscopy (SEM) images of PVDF particles.
Figure 3B:
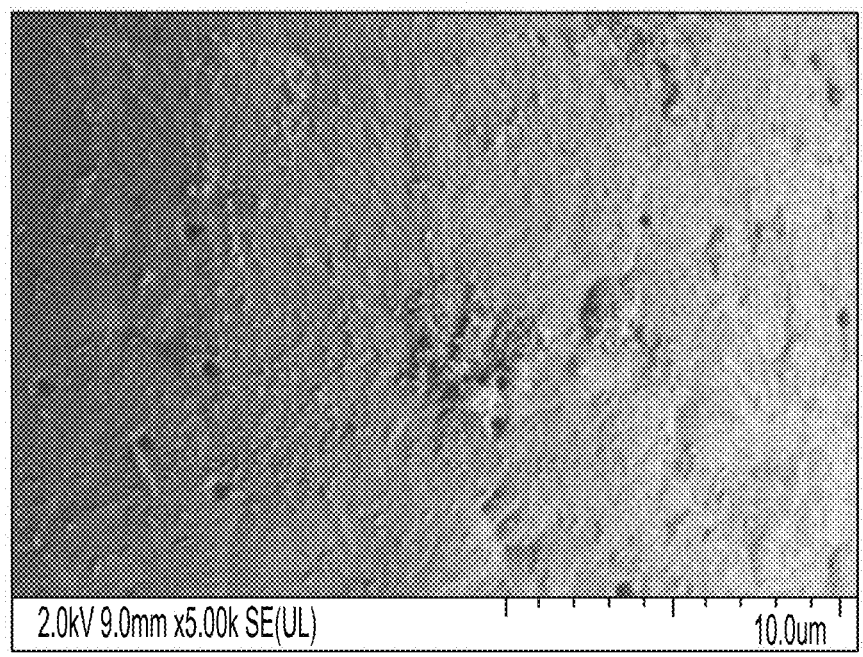

FIGS. 3A and 3B are scanning electron microscopy (SEM) images of Sample 1 illustrating highly spherical PVDF particles with the emulsion stabilizer present as a coating on the surface of the PVDF particles.

Figure 4:
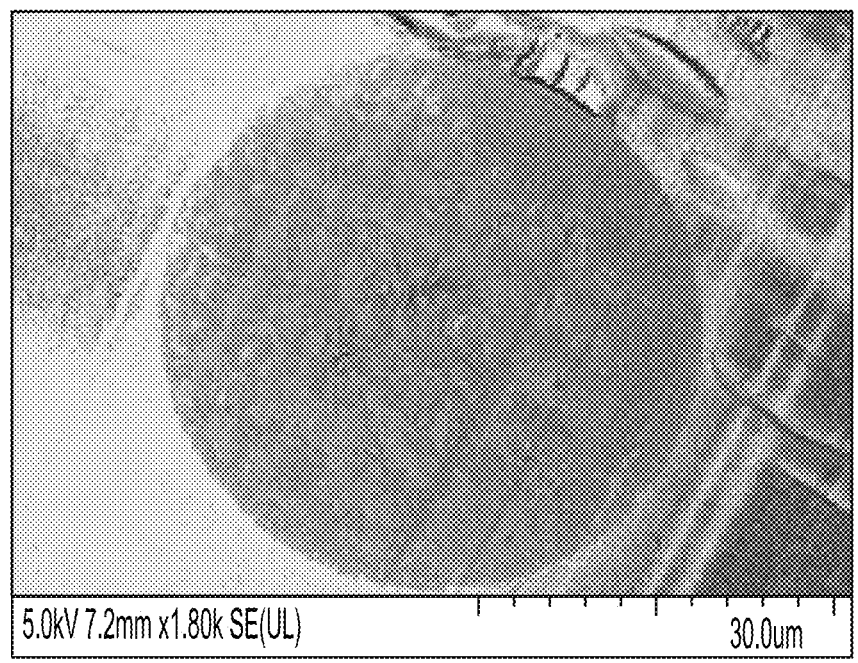
FIG. 4 is a cross-sectional SEM image of a PVDF particle.

FIG. 4 is a cross-sectional SEM image (sample fixed in epoxy then microtomed) of Sample 1 illustrating little to no voids in the core of the PVDF particle.

The single layer sintering of the PVDF particles in Table 2 showed no blocking or sticking of powder on under layer of sintered square. The layer started sintering at 30-35% laser power and only slight edge curl was noted at higher laser power. The porosity of the sintered layer was very low to none.

Example 3. About 0.075 g of graphene oxide (Single Layer Graphene Oxide Flake (H Method), available from ACS Material) and about 50 g dimethylformamide were mixed. The mixture was stirred with a magnetic stir bar at about 400 RPM for about 30 minutes at room temperature. The dispersion was then placed in an ice bath and sonicated (10% power, 90% duty) for about 1.5 hours. The dispersion was removed from the ice bath and an additional 50.7 g DMF was added. The dispersion was stirred overnight at about 500 RPM and room temperature.

The following day the dispersion was once again place in an ice bath and sonicated (10% power, 90% duty) for about 1 hour. About 20.35 g KYNAR® 710 PVDF was then added and stirred for about 75 minutes at about 50 RPM and about 60° C. Upon completion the dispersion was poured into an aluminum plate and stirred with magnetic stir bar. Simultaneously the plate was heated to about 60° C. with a flow of air over the dispersion. After evaporation of the solvent, a GO-PVDF composite film was obtained.

Example 4. Sample 9 Preparation: About 22.85 g PEG (20 kDa) and about 5.66 g PVDF-GO composite (from Example 3) were added to a 100 mL glass reactor equipped with P4 impeller and N2 flow. The mixture was heated to about 220° C., and the mixing was slowly ramped to about 500 RPM. The mixture was stirred at about 220° C. for about 30 minutes. After heating for about 30 minutes, the heating mantle was removed, the mixing ceased, and the slurry was allowed to cool to room temperature slowly. The slurry was then diluted with methanol and filtered. The resulting GO-PVDF particles was subsequently washed 3 times with methanol. After drying overnight under vacuum, the GO-PVDF particles were filtered with a 150 micron sieve.

Sample 10 Preparation: The Sample 9 preparation was repeated.

Sample 11 Preparation: The Sample 9 preparation was repeated except scaled up by a factor of about 8.

Table 3 provides the properties of the GO-PVDF particles.

TABLE 3

GO-PVDF Particle Properties

| Sample | D10 (microns) | D50 (microns) | D90 (microns) | Span |
|---|---|---|---|---|
| 9 | 32 | 54 | 109 | 1.4 |
| 10 | 28 | 54 | 109 | 1.5 |
| 11 | 50 | 83 | 136 | 1.0 |

Figure 5A:
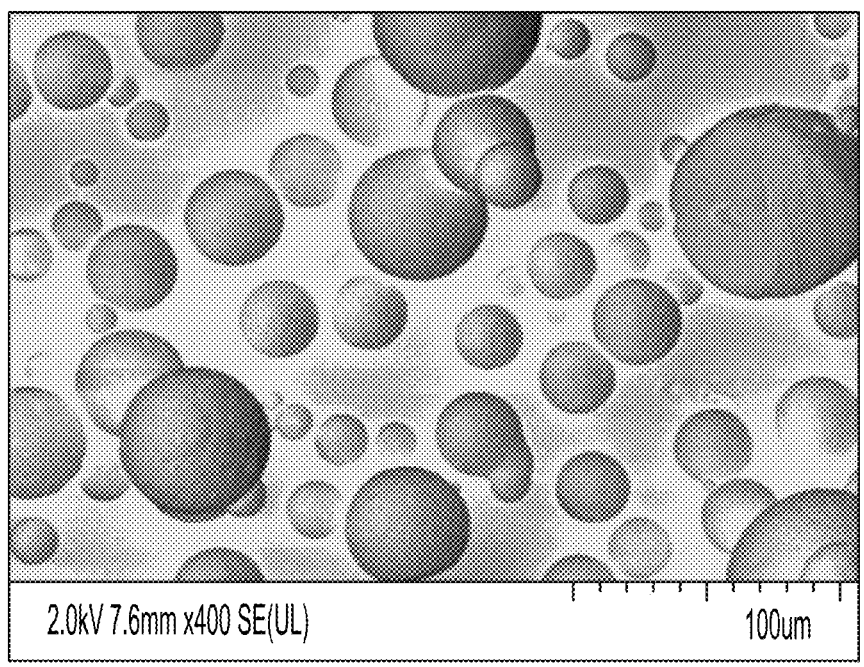
FIGS. 5A, 5B, and 5C are SEM images of GO-PVDF particles of the present disclosure.
Figure 5B:
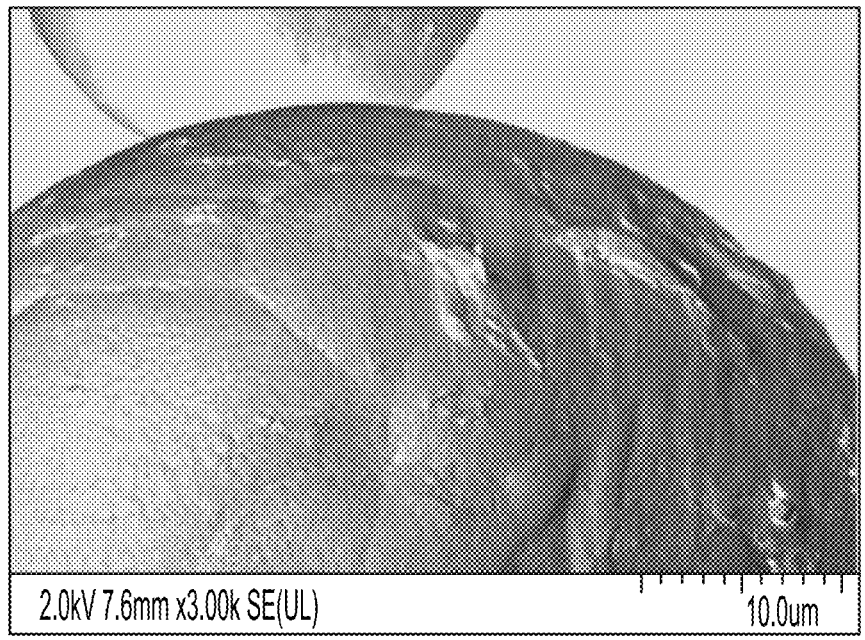
Figure 5C:
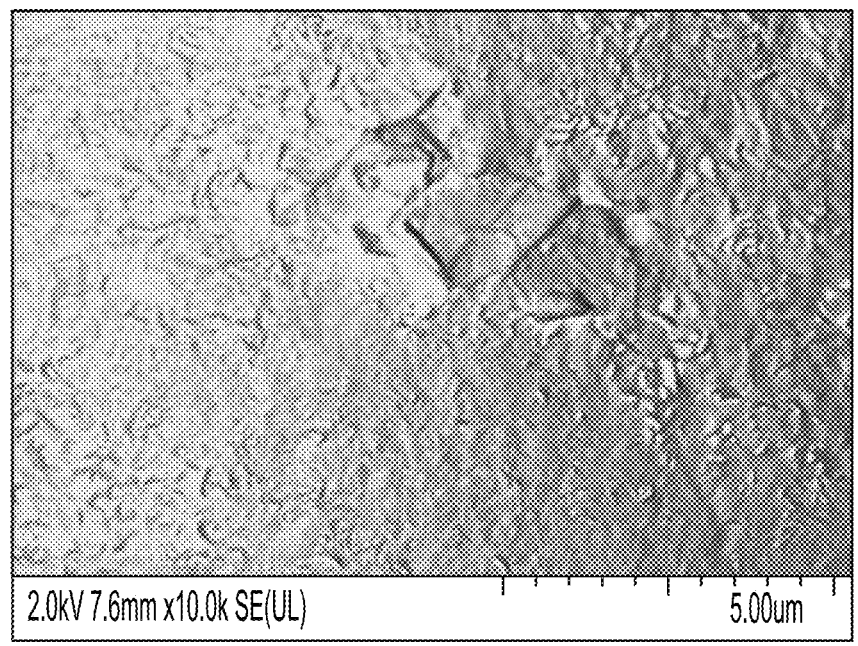

FIGS. 5A, 5B, and 5C are SEM images of Sample 10 illustrating highly spherical GO-PVDF particles with evidence of graphene oxide on the surface of the GO-PVDF particles.

Figure 6A:
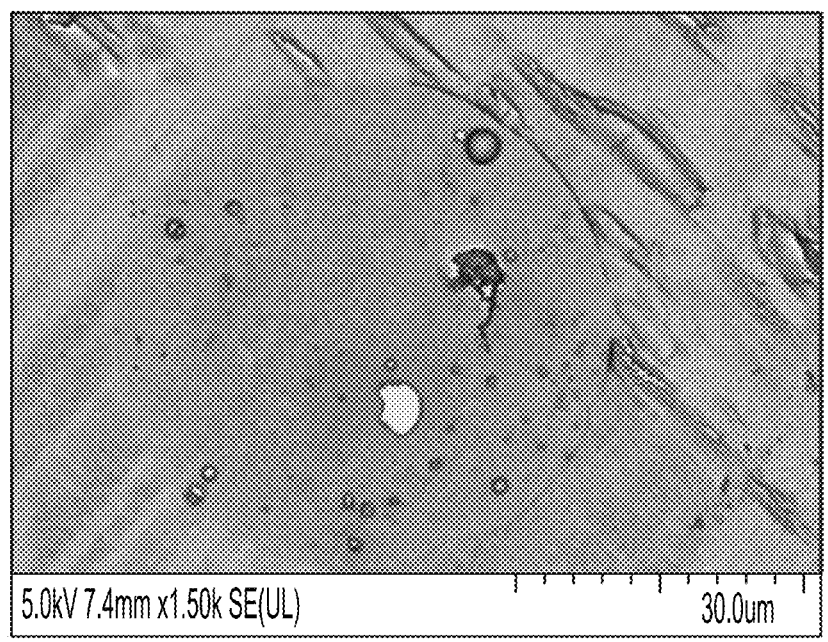
FIGS. 6A, 6B, and 6C are cross-sectional SEM images of GO-PVDF particles of the present disclosure.
Figure 6B:
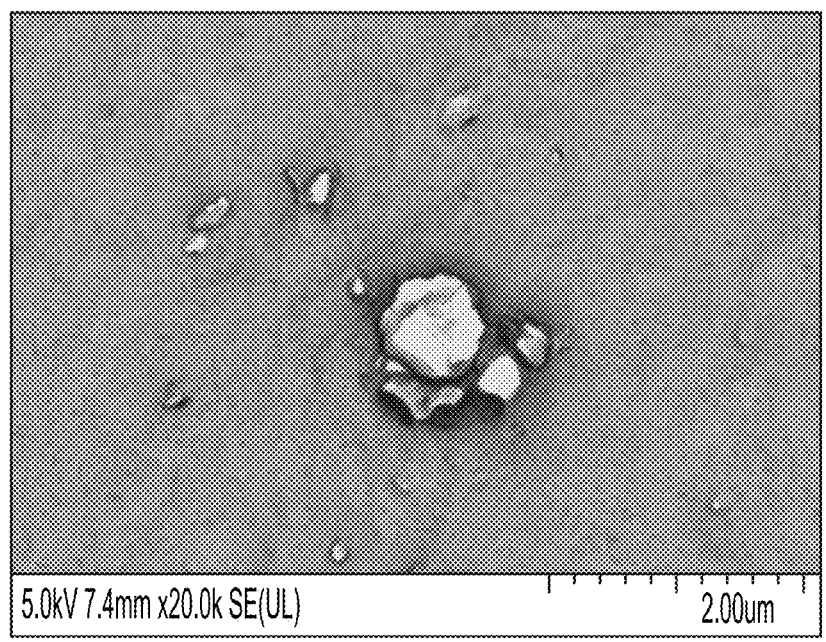
Figure 6C:
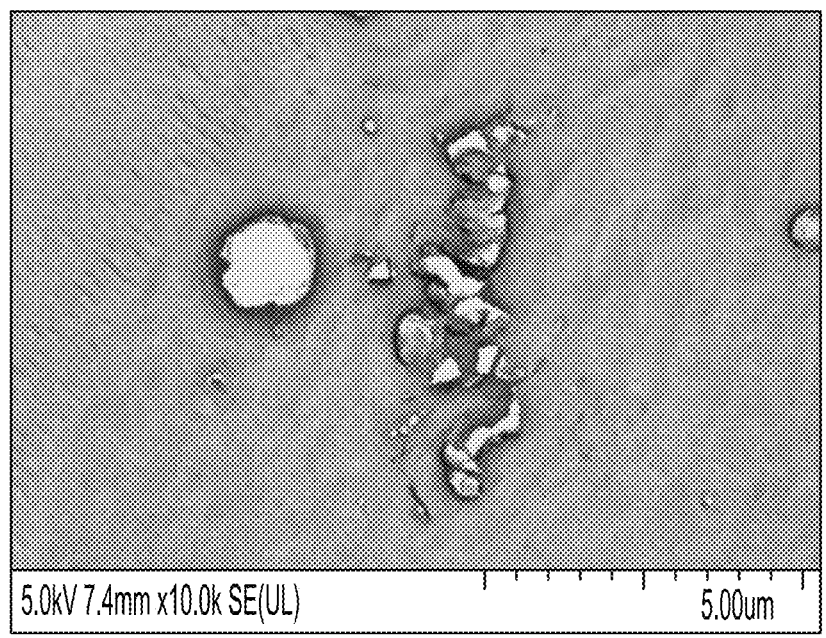

FIGS. 6A, 6B, and 6C are cross-sectional SEM images (sample fixed in epoxy then microtomed) of Sample 10 illustrating highly spherical GO-PVDF particles with evidence of graphene oxide agglomerates in the core of the GO-PVDF particles (FIG. 6A), graphene oxide in voids within the core of the GO-PVDF particles (FIG. 6B), and graphene oxide dispersed in the PVDF of the GO-PVDF particles (FIG. 6C appears to have a graphene oxide nanosheet extending from the left side of the image to the left portion of the top of the image).

Figure 7:
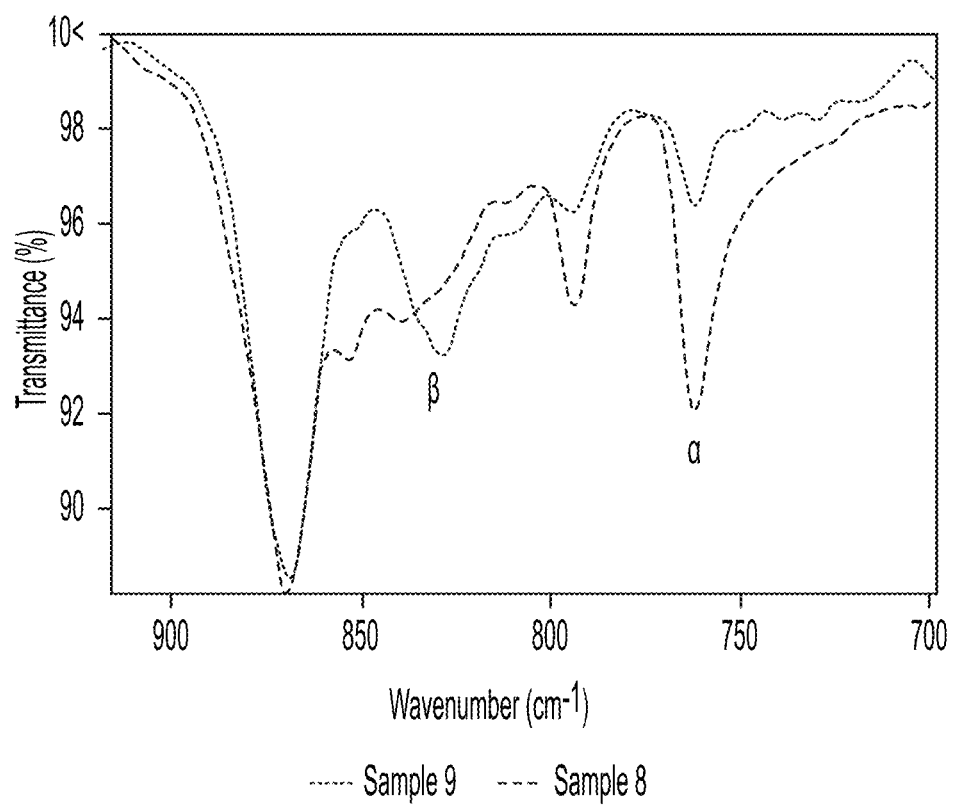
FIG. 7 is the normalized Fourier-transform infrared (FTIR) spectrum for the samples described in the Examples section including GO-PVDF particles of the present disclosure.

FIG. 7 is the normalized Fourier-transform infrared (FTIR) spectrum for Sample 8 (PVDF particles) and Sample 9 (GO-PVDF particles) illustrating that β-phase crystallinity (about 832 cm$^{-1}$) is present in the GO-PVDF particles to a greater degree than the PVDF particles and the α-phase crystallinity (about 760 cm$^{-1}$) is present in the GO-PVDF particles to a lesser degree than the PVDF particles.

TABLE 4

| Sample | t-FTIR-β (%) | t-FTIR-α (%) | Ratio β/α | β retention after sintering* |
|---|---|---|---|---|
| GO-PVDF composite film | 0.27 | 0.79 | 0.34 | |
| 10 | 0.29 | 0.75 | 0.39 | |
| 11 | 0.28 | 0.46 | 0.61 | |
| KYNAR® 710 PVDF | none present | 0.31 | | |
| Sintered 11 | 0.32 | 0.55 | 0.58 | 0.88 |

*(t-FTIR-β for 11/t-FTIR-β for sintered 11)

Figure 8:
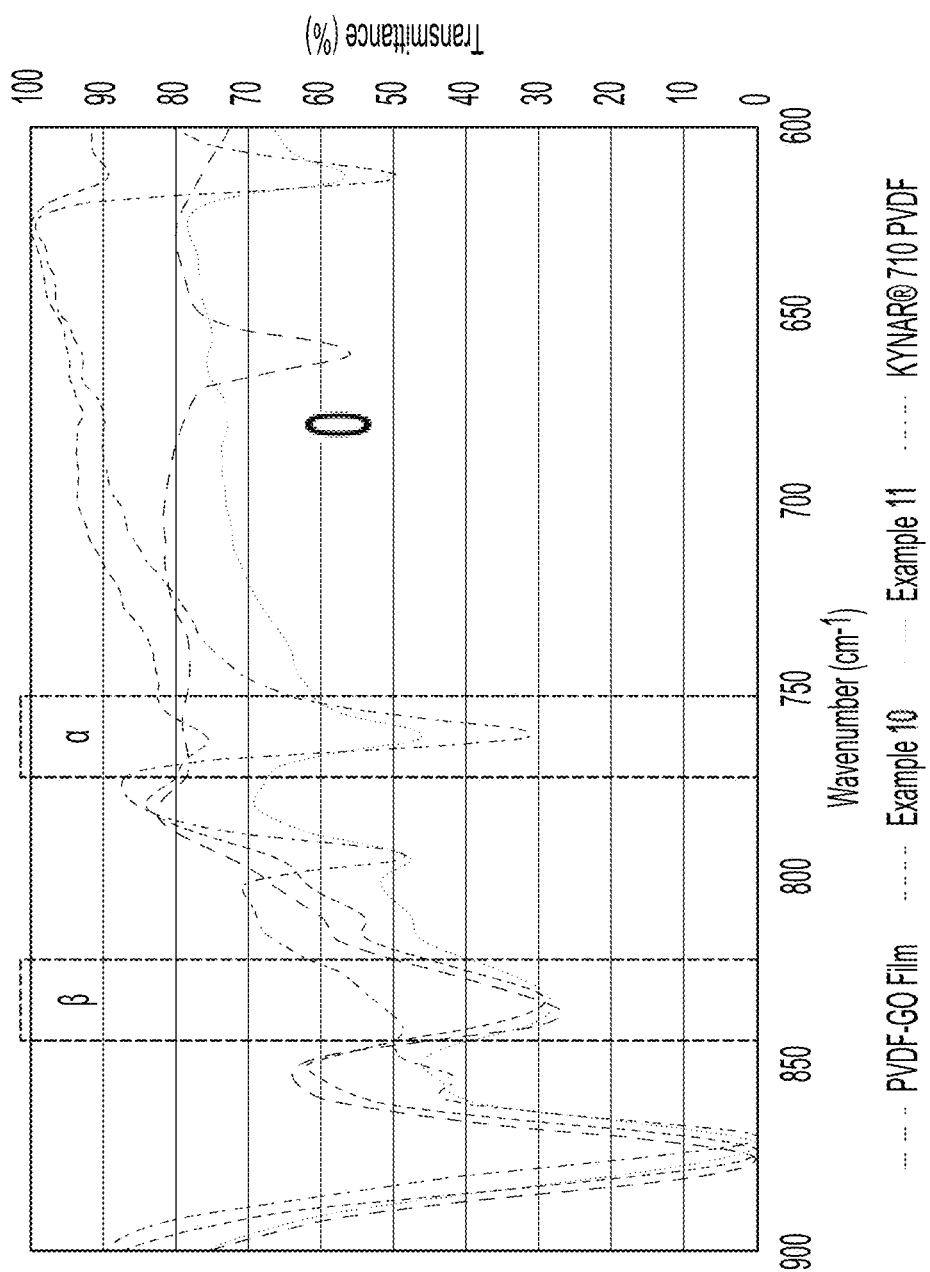
FIG. 8 is the normalized FTIR spectrum for the samples described in the Examples section including GO-PVDF particles of the present disclosure.

FIG. 8 is the normalized FTIR spectrum for the as-prepared GO-PVDF composite film of Example 3, Sample 10, Sample 11, and KYNAR® 710 PVDF. These spectra illustrate the presence of a strong β-phase crystallinity peak in the GO-PVDF composite film that remains in the GO-PVDF particles produced therefrom (Samples 10 and 11). In contrast, the KYNAR® 710 PVDF has little to no β-phase crystallinity peak and a strong α-phase crystallinity peak.

TABLE 5

| Sample | t-FTIR-β (%) | t-FTIR-α (%) | Ratio β/α |
|---|---|---|---|
| 8 | not present | 0.32 | |
| 9 | 0.40 | 0.64 | 0.63 |

Figure 9A:
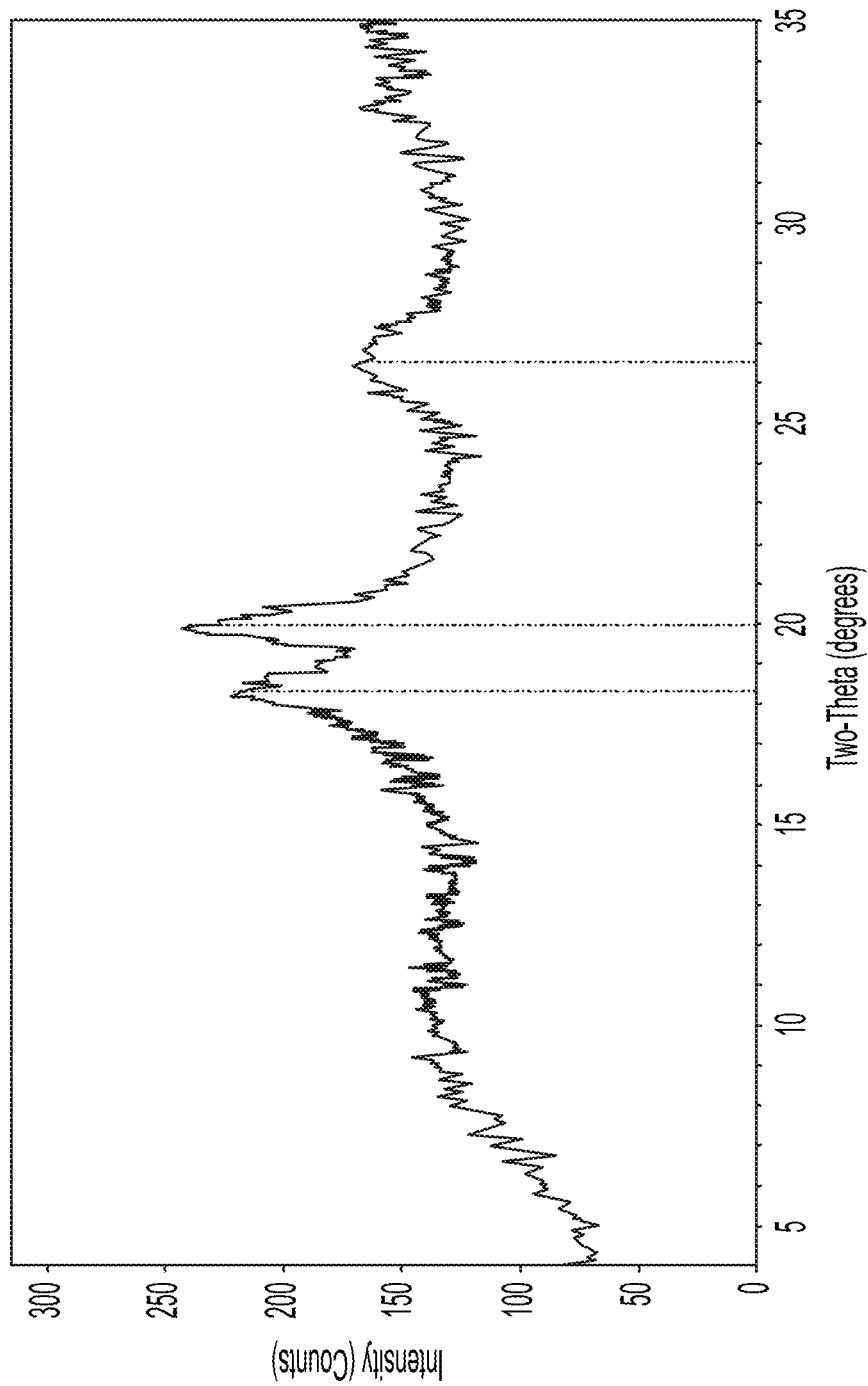
FIGS. 9A, 9B, and 9C are x-ray powder diffraction (XRD) spectra for the samples described in the Examples section including GO-PVDF particles of the present disclosure.
Figure 9B:
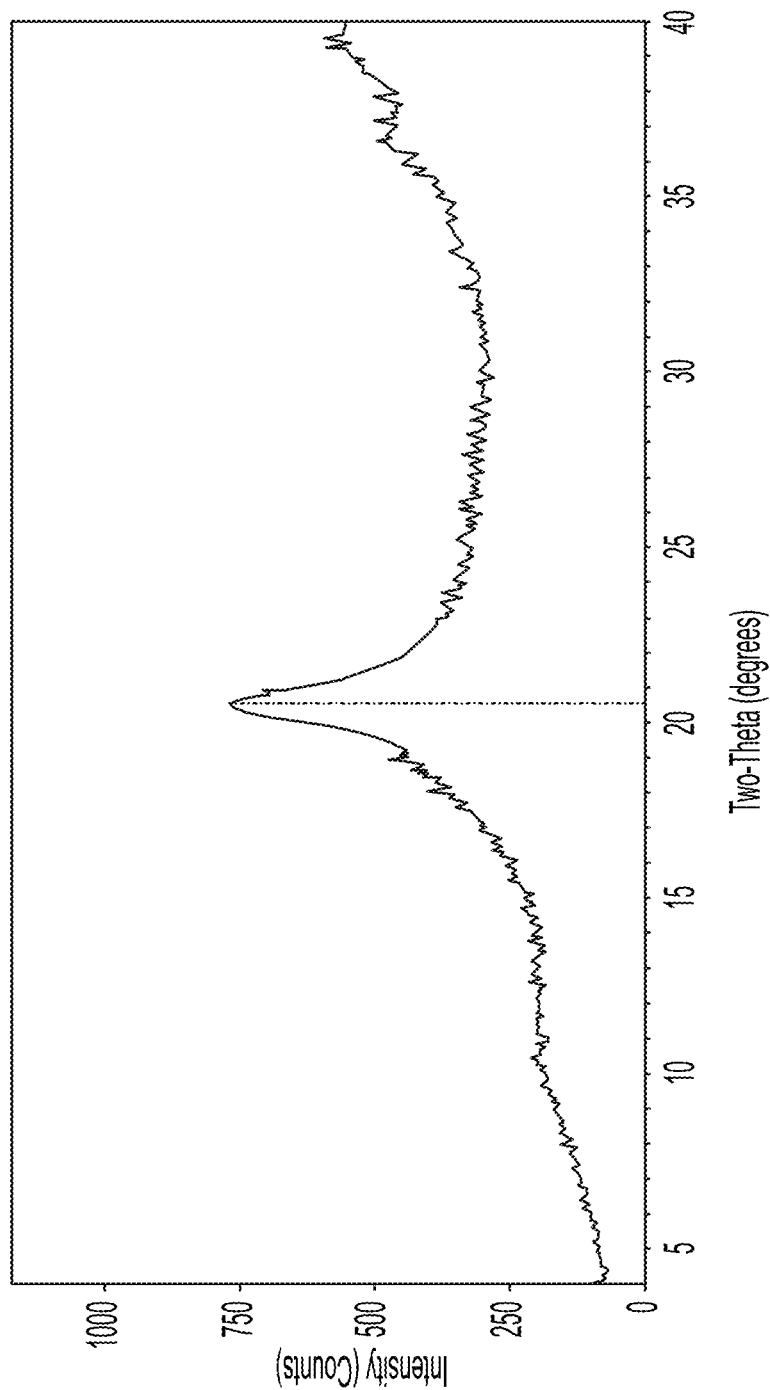
Figure 9C:
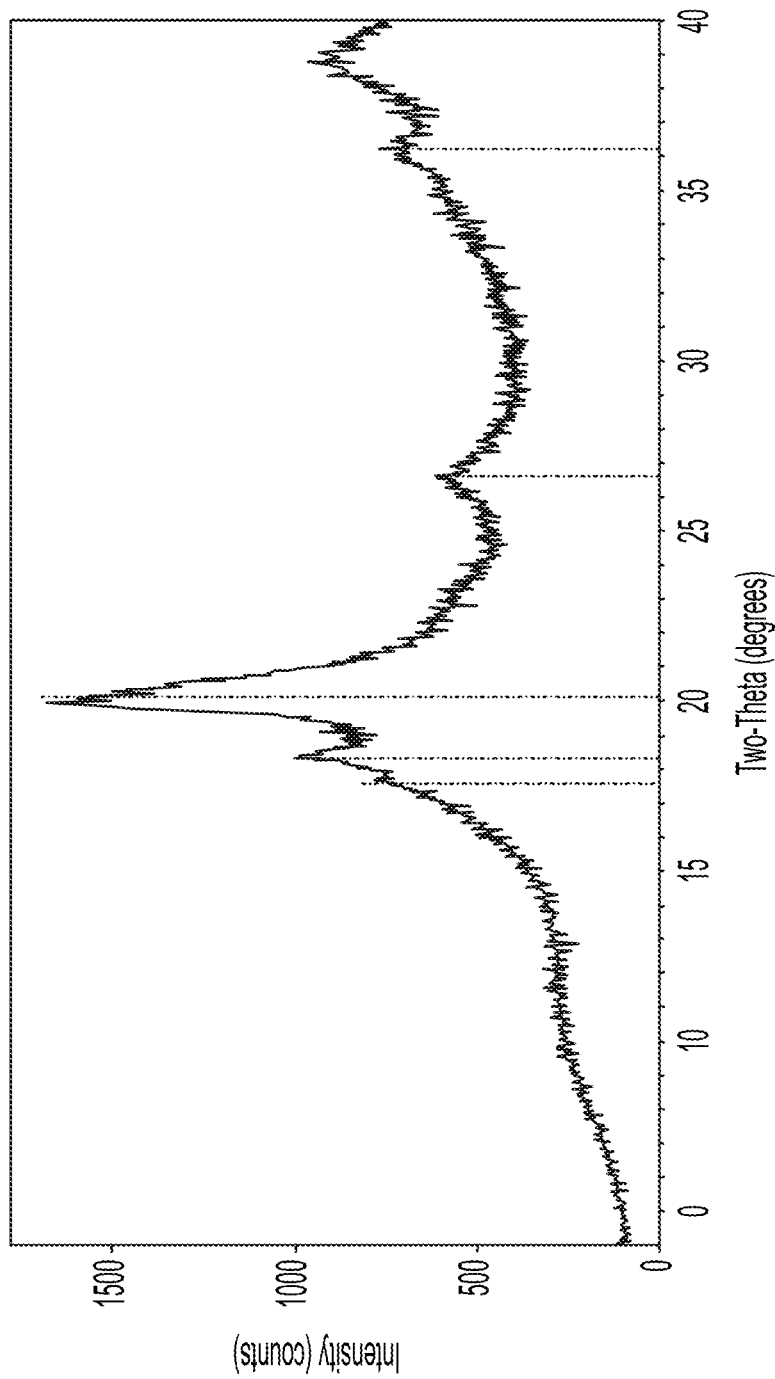

FIGS. 9A, 9B, and 9C are x-ray powder diffraction (XRD) spectra for KYNAR® 710 PVDF, the GO-PVDF composite film of Example 3, and Sample 9, respectively. These spectra illustrate that the KYNAR® 710 PVDF has both α-phase crystallinity (2θ of about 26.5°) and β-phase crystallinity (2θ of about 20°), the GO-PVDF composite film has β-phase crystallinity and little to no α-phase crystallinity, and Sample 9 has predominantly β-phase crystallinity although some α-phase crystallinity has reemerged.

Example 5. The GO-PVDF particles of Sample 11 were sintered using a Sharebot (SnowWhite) SLS printer. There was no blocking of GO-PVDF particles after the heat cycle and very little powder stuck on the back of the sintered layer. The GO-PVDF particle layer sintered around 25% power. There was minimal curl or warpage of layer and the porosity of the layer was around 6%. A higher laser power setting may reduce the porosity.

Figure 10:
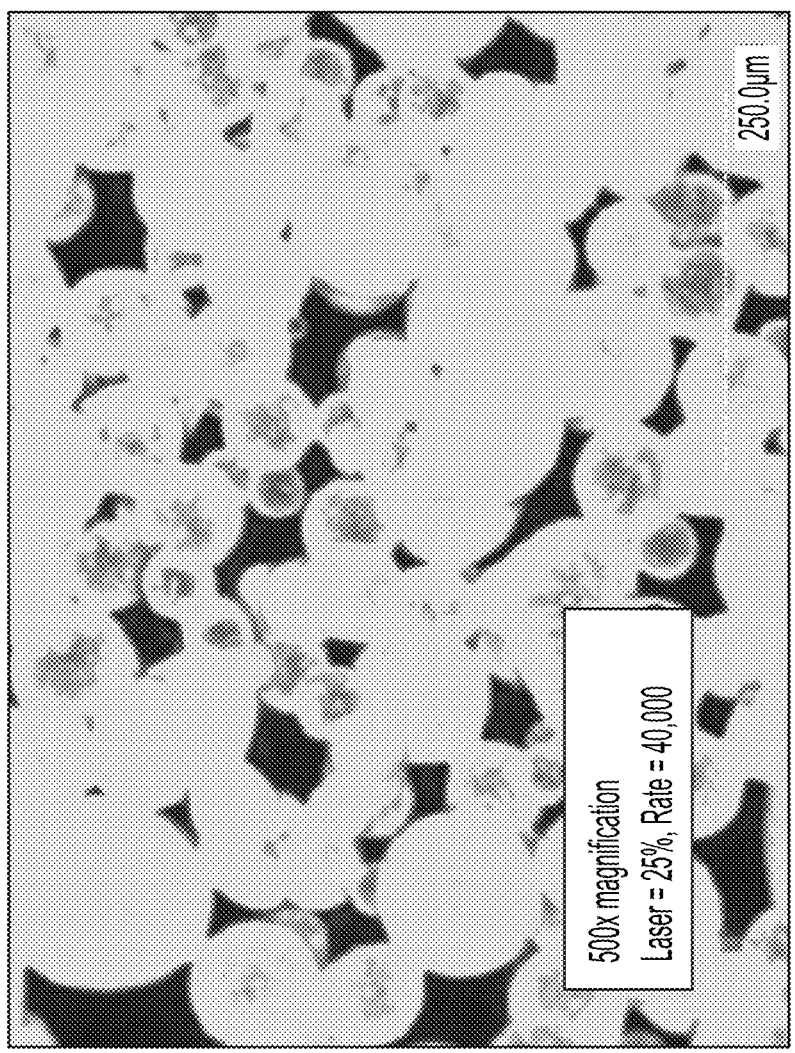
FIG. 10 is a light microscopy image of the sintered layer produced from the GO-PVDF particles of the present disclosure.

The Sample 11 GO-PVDF particles started sintering at a lower laser power setting of 25% as compared to the 35% needed to start sintering the PVDF particles that do not include graphene oxide. Further, the porosity of the layer produced from the GO-PVDF particles was higher than the layer produced from the PVDF particles (6% versus 0.3%). FIG. 10 is a light microscopy image of the sintered layer produced from the GO-PVDF particles illustrating sintering of adjacent particles and graphene oxide dispersed throughout the GO-PVDF particles.

FTIR spectroscopy was performed on the GO-PVDF particles of Sample 11 and the sintered layer produced therefrom. The β-phase crystallinity was maintained in the sintering process. That is, the sintered layer produced from the GO-PVDF particles showed substantially the same β-phase crystallinity as the GO-PVDF particles.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method of making graphene-oxide-polyvinylidene fluoride (GO-PVDF) particles, comprising:
    providing a graphene oxide-polyvinylidene fluoride (GO-PVDF) composite comprising graphene oxide dispersed in polyvinylidene fluoride (PVDF), wherein the GO-PVDF composite has a transmission FTIR minimum transmittance ratio of β-phase PVDF to α-phase PVDF of about 1 or less;
    mixing a mixture comprising a GO-PVDF composite, a carrier fluid that is immiscible with the PVDF, and optionally an emulsion stabilizer, at a temperature equal to or greater than a melting point or softening temperature of the PVDF to disperse the GO-PVDF composite in the carrier fluid;
    cooling the mixture to below the melting point or softening temperature of the PVDF to form GO-PVDF particles; and
    separating the GO-PVDF particles from the carrier fluid, wherein the GO-PVDF particles comprise the graphene oxide dispersed in the PVDF, and wherein the GO-PVDF particles have a transmission FTIR minimum transmittance ratio of β-phase PVDF to α-phase PVDF of about 1 or less.

2. The method of claim 1 further comprising:
    producing a mixture comprising the graphene oxide, the PVDF, and a solvent; and
    evaporating the solvent from the mixture to yield the GO-PVDF composite, the GO-PVDF composite comprising about 1 wt % or less of the solvent.

3. The method of claim 2, wherein evaporating is at a temperature less than a boiling point+10° C. of the solvent ($T_{BP+10C}$ of the solvent).

4. The method of claim 2, wherein evaporating comprises heating the mixture to a temperature less than a boiling point+10° C. of the solvent ($T_{BP+10C}$ of the solvent), and passing a gas over a surface of the mixture.

5. The method of claim 2, wherein producing the mixture comprises dispersing the graphene oxide in the solvent, and dissolving the PVDF in the solvent having the graphene oxide dispersed therein.

6. The method of claim 1, wherein the GO-PVDF particles have a D10 of about 0.1 μm to about 125 μm, a D50 of about 0.5 μm to about 200 μm, and a D90 of about 3 μm to about 300 μm, wherein D10<D50<D90.

7. The method of claim 1, wherein the GO-PVDF particles have a diameter span of about 0.2 to about 10.

8. The method of claim 1, wherein the GO-PVDF particles have a circularity of about 0.90 to about 1.0.

9. The method of claim 1, wherein the mixture does not comprise an emulsion stabilizer.

10. A method of making a graphene oxide-polyvinylidene fluoride (GO-PVDF) composite, comprising:
    producing a mixture comprising graphene oxide, PVDF, and a solvent; and
    evaporating the solvent from the mixture to yield a GO-PVDF composite that comprises about 1 wt % or less of the solvent, wherein evaporating is at a temperature less than a boiling point+10° C. of the solvent ($T_{BP+10C}$ of the solvent), and wherein the GO-PVDF composite has a transmission FTIR minimum transmittance ratio of β-phase PVDF to α-phase PVDF of about 1 or less.

11. The method of claim 10, wherein evaporating comprises heating the mixture to the temperature less than $T_{BP+10C}$ of the solvent, and passing a gas over a surface of the mixture.

12. The method of claim 10, wherein producing the mixture comprises dispersing the graphene oxide in the solvent, and dissolving the PVDF in the solvent having the graphene oxide dispersed therein.

13. The method of claim 10 further comprising:
    melt emulsifying the GO-PVDF composite to produce GO-PVDF particles, wherein the GO-PVDF particles have a β-phase retention from the GO-PVDF composite of about 0.1 to about 1.5.

14. The method of claim 13, wherein an emulsion stabilizer is not present during the melt emulsifying.

15. The method of claim 10, wherein the solvent is selected from the group consisting of dimethylformamide (DMF), dimethylacetamide (DMAC), N-methyl-2-pyrrolidone (NMP), triethyl phosphate (TEP), dimethyl sulfoxide (DMSO), acetone, hexamethylphosphoramide (HMPA), and any combination thereof.

* * * * *